US006311695B1

(12) United States Patent
Williams

(10) Patent No.: US 6,311,695 B1
(45) Date of Patent: Nov. 6, 2001

(54) METHOD OF TREATING TOBACCO TO REDUCE NITROSAMINE CONTENT, AND PRODUCTS PRODUCED THEREBY

(75) Inventor: Jonnie R. Williams, Goochland County, VA (US)

(73) Assignee: Regent Court Technologies, Chesterfield, MO (US)

( * ) Notice: Subject to any disclaimer, the term of this patent is extended or adjusted under 35 U.S.C. 154(b) by 0 days.

(21) Appl. No.: 09/272,191

(22) Filed: Mar. 18, 1999

Related U.S. Application Data

(60) Division of application No. 08/998,043, filed on Dec. 23, 1997, now abandoned, which is a continuation-in-part of application No. 08/879,905, filed on Jun. 20, 1997, now Pat. No. 6,135,121, which is a continuation-in-part of application No. 08/757,104, filed on Dec. 2, 1996, now Pat. No. 5,803, 081, which is a continuation-in-part of application No. 08/739,942, filed on Oct. 30, 1996, now abandoned, which is a continuation-in-part of application No. 08/725,691, filed on Sep. 23, 1996, now abandoned, which is a continuation-in-part of application No. 08/671,718, filed on Jun. 28, 1996, now Pat. No. 5,845,647.

(60) Provisional application No. 60/023,205, filed on Aug. 5, 1996.

(51) Int. Cl.$^7$ ................................................ A24B 15/22

(52) U.S. Cl. .................... 131/299; 131/290; 131/295; 131/297; 432/500

(58) Field of Search .................................... 131/290, 295, 131/297, 299; 432/500; 426/240, 241

(56) References Cited

U.S. PATENT DOCUMENTS

| | | |
|---|---|---|
| Re. 18,256 | * 11/1931 | Lilienfield . |
| 924,284 | * 6/1909 | Smith . |
| 1,731,018 | * 10/1929 | Lilienfield . |

(List continued on next page.)

FOREIGN PATENT DOCUMENTS

| | | |
|---|---|---|
| 1767677 | 6/1968 | (DE) . |
| 1767677 | * 11/1971 | (DE) . |
| 3904169A1 | 8/1990 | (DE) . |
| 706052 | 3/1954 | (GB) . |
| 1484663 | 2/1975 | (GB) . |
| 2 064 294 A | 6/1981 | (GB) . |
| WO 94/07382 | 4/1994 | (WO) . |

OTHER PUBLICATIONS

R.A. Anderson et al., Changes in Chemical Composition of Homogenized Leaf–Cured and Air–Cured Burley Tobacco Stored in Controlled Environments, 1982 American Chemical Society, J. Agric. Food Chem. 1982, 30, 663–668.

C.T. MacKown et al., Tobacco–Specific N–Nitrosamines: Formation During Processing of Midrib and Lamina Fines, 1988 American Chemical Society, J. Agric. Food Chem. 1988, 36, 1031–1035.

R.A. Andersen et al., Accumulation of 4–(N–Methyl–N–nitrosamino)–1–(3–pyridyl)–1–butanone in Alkaloid Genotypes of Burley Tobacco during Postharvest Processing: Comparisons with N'–Nitrosonornicotnie and Probable Nitrosamine Precursors, Cancer Research vol. 45, Nov. 1985, pp. 5287–5293.

(List continued on next page.)

Primary Examiner—Michael P. Colaianni
(74) Attorney, Agent, or Firm—Banner & Witcoff, Ltd.

(57) ABSTRACT

Methods of reducing the content of and preventing formation of carcinogenic nitrosamines in harvested leafy plants such as tobacco and marijuana, are disclosed. The methods are directed to subjecting the plant to microwave and/or higher frequency radiation, at appropriate times in the cure cycle. With tobacco, products suitable for human consumption, such as cigarettes, cigars, etc., can be made in accordance with the present invention, having contents of tobacco-specific nitrosamines on a par with fresh-cut, green tobacco. In preferred embodiments, the resultant tobacco products are dried, golden-yellow leaves having almost negligible amounts of the known carcinogens NNN and NNK, in comparison to conventionally cured tobacco.

17 Claims, 3 Drawing Sheets

(1 of 3 Drawing Sheet(s) Filed in Color)

U.S. PATENT DOCUMENTS

| Patent No. | | Date | Inventor |
|---|---|---|---|
| 1,813,833 | * | 7/1931 | Andrews . |
| 1,920,588 | * | 8/1933 | Pacini . |
| 1,926,035 | * | 9/1933 | Chesley . |
| 1,926,036 | * | 9/1933 | Chesley . |
| 2,475,568 | | 7/1949 | Moore, Jr. . |
| 2,534,222 | * | 12/1950 | Brasch . |
| 2,758,603 | | 8/1956 | Heljo . |
| 2,989,057 | | 6/1961 | Touton . |
| 3,024,792 | | 3/1962 | Touton . |
| 3,039,475 | | 6/1962 | Neukomm et al. . |
| 3,202,157 | | 8/1965 | Touton . |
| 3,358,694 | * | 12/1967 | Boenig et al. . |
| 3,394,709 | | 7/1968 | Remer . |
| 3,409,023 | * | 11/1968 | Zygmunt De La Burde . |
| 3,494,723 | | 2/1970 | Gray . |
| 3,494,724 | | 2/1970 | Gray . |
| 3,589,374 | * | 6/1971 | Aoki et al. . |
| 3,664,034 | | 5/1972 | Wilson . |
| 3,699,976 | | 10/1972 | Abe et al. . |
| 3,773,055 | | 11/1973 | Stungis et al. . |
| 3,785,384 | | 1/1974 | Sylvester et al. . |
| 3,845,774 | | 11/1974 | Tso et al. . |
| 3,870,053 | | 3/1975 | Heitkamp et al. . |
| 3,877,468 | | 4/1975 | Lichtneckert et al. . |
| 3,901,248 | | 8/1975 | Lichtneckert . |
| 4,156,431 | | 5/1979 | Epstein et al. ............... 131/10.7 |
| 4,212,634 | | 7/1980 | Mitchell et al. . |
| 4,301,817 | | 11/1981 | Keritsis . |
| 4,317,837 | | 3/1982 | Kehoe et al. . |
| 4,355,648 | | 10/1982 | Bokleman et al. . |
| 4,364,401 | | 12/1982 | Keritsis . |
| 4,430,806 | | 2/1984 | Hopkins . |
| 4,470,422 | | 9/1984 | Joubert et al. . |
| 4,556,073 | | 12/1985 | Gravely et al. . |
| 4,557,280 | | 12/1985 | Gravely et al. . |
| 4,559,956 | | 12/1985 | De Lange et al. . |
| 4,566,469 | | 1/1986 | Semp et al. . |
| 4,572,219 | | 2/1986 | Gaisch et al. . |
| 4,590,954 | | 5/1986 | Gooden . |
| 4,620,556 | | 11/1986 | Rosson et al. . |
| 4,622,982 | | 11/1986 | Gaisch et al. . |
| 4,651,759 | | 3/1987 | Uydess . |
| 4,709,710 | | 12/1987 | Gaisch et al. . |
| 4,756,317 | | 7/1988 | Edwards . |
| 4,802,498 | | 2/1989 | Ogren . |
| 4,805,642 | | 2/1989 | Rainer . |
| 4,821,747 | | 4/1989 | Stuhl et al. . |
| 4,836,222 | | 6/1989 | Livingston . |
| 4,874,000 | | 10/1989 | Tamol et al. . |
| 4,898,189 | | 2/1990 | Wochnowski . |
| 4,906,274 | | 3/1990 | Mattox . |
| 4,907,605 | | 3/1990 | Ray et al. . |
| 5,023,376 | | 6/1991 | Shehad et al. . |
| 5,125,420 | | 6/1992 | Livingston . |
| 5,127,934 | | 7/1992 | Mattox . |
| 5,139,035 | | 8/1992 | Lasch et al. . |
| 5,335,590 | | 8/1994 | Crump, III et al. . |
| 5,372,149 | | 12/1994 | Roth et al. . |
| 5,431,175 | | 7/1995 | Beckett et al. . |
| 5,488,962 | | 2/1996 | Perfetti . |
| 5,515,775 | | 5/1996 | Crump, III et al. . |
| 5,791,353 | | 8/1998 | Junemann et al. . |
| 5,803,081 | | 9/1998 | O'Donnell, Jr. et al. . |
| 5,810,020 | | 9/1998 | Northway et al. ............... 131/297 |
| 5,845,647 | | 12/1998 | O'Donnell, Jr. et al. . |
| 6,119,701 | * | 9/2000 | Cerami et al. . |

OTHER PUBLICATIONS

W.J. Chamberlain et al., Effects of Curing and Fertilization on Nitrosamine Formation in Bright and Burley Tobacco, Phytochemical Research Unit, USDA, Agricultural Research Service, Beitrage zur Tabakforschung International, vol. 15, No. 2, Apr. 1992.

C. Mingwu et al., Effect of Maleic Hydrazide Application on Accumulation of Tobacco–Specific Nitrosamines in Air–Cured Burley Tobacco, J. Agric. Food (1994), 42(12), 2912–16.

W.J. Chamberlain et al., Studies on the Reduction of Nitrosamines in Tobacco, Tobacco International, (1986) vol. 188, No. 16, pp. 38–39.

Q. Qungang, Changes In Tobacco–Specific Nitrosamines, Alkaloids, Nitrate, Nitrite and Lamina Leachate Conductivity of Dark Tobacco During Curing, Bulletin d'Information—Coresta, (1991) No. 2, pp. 7–22.

C. Mingwu, The Source and the Regulation of Nitrogen Oxide Production for Tobacco–Specific Nitrosamine Formation During Air–Curing, University of Kentucky, Lexington, (1998) 178pp. Avail., :UMI, Order No. DA9907718 From: Diss. Abstr. Int., B 1999, 59(9), 4548 Dissertation.

W.J. Chamberlain et al., Levels of N–nitrosonornicotine in Tobaccos Grown Under Varying Agronomic Conditions, Tobacco International, (1984) vol. 186, No. 26, pp. 111–113.

H. R. Burton et al., "Influence of Temperature and Humidity on the Accumulation of Tobacco–Specific Nitrosamines in Stored Burley Tobacco", J. Agric. Food Chem., 1989, 37, pp. 1372–1377.

Abstract, "Treatment of Organic Materials", Research Disclosure, No. 29139, Jul. 1988, XP000054259, New York, NY.

Search Report from EP 97 93 8069 dated Oct. 14, 1999.

International Search Report from PCT/US99/20909 dated Dec. 23, 1999.

Declaration of Harold R. Burton, Ph.D with Exhibits A–H as follows.

(A) Data from QD, FD, MW Sample Testing/1993 Study.

(B) Data from QD and FD Sample Testing/1994 Study.

(C) Progress Report/Undated.

(D) CORESTA Conference, Agronomy & Phytopathology Joint Meeting, Reunion Commune Des Groupes Agronomie Et Phytopathologie/Abstracts, Oxford 1995 (see Abstract on p. 5—Burton, et al.).

(E) Overheads from 1995 CORESTA conference presentation by Burton, 1993 Study.

(F) Overheads from 1995 CORESTA conference presentation by Burton, 1994 Study.

(G) Wiernik et al., Effect Of Air–Curing On The Chemical Composition Of Tobacco/1995; and.

(H) Burton Letter to Jonnie R. Williams.

* cited by examiner

METHOD OF TREATING TOBACCO TO REDUCE NITROSAMINE CONTENT, AND PRODUCTS PRODUCED THEREBY

CROSS-REFERENCE TO RELATED APPLICATIONS

This is a divisional of application Ser. No. 08/998,043 filed Dec. 23, 1997, now abandoned the disclosure of which is incorporated herein by reference, which is a continuation-in-part of application Ser. No. 08/879,905 filed Jun. 20, 1997, now U.S. Pat. No. 6,135,121 which is a continuation-in-part of application Ser. No. 08/757,104 filed Dec. 2, 1996 now U.S. Pat. No. 5,803,081, which is a continuation-in-part of application Ser. No. 08/739,942 filed Oct. 30, 1996, now abandoned, which is a continuation-in-part of application Ser. No. 08/725,691, filed Sep. 23, 1996, now abandoned, which is a continuation-in-part of application Ser. No. 08/671,718, filed Jun. 28, 1996 now U.S. Pat. No. 5,845,647. The present application and the applications recited above, with the exception of application Ser. No. 08/671,718, filed Jun. 28, 1996, claim priority to provisional application Ser. No. 60/023,205, filed Aug. 5, 1996.

FIELD OF THE INVENTION

The present invention relates to a method of treating tobacco to reduce the content of, or prevent formation of, harmful nitrosamines which are normally found in tobacco. The present invention also relates to tobacco products having low nitrosamine content.

BACKGROUND OF THE INVENTION

Others have described the use of microwave energy to dry agricultural products. Use of microwave energy to cure tobacco is disclosed in U.S. Pat. No. 4,430,806 to Hopkins. In U.S. Pat. No. 4,898,189, Wochnowski teaches the use of microwaves to treat green tobacco in order to control moisture content in preparation for storage or shipping. In U.S. Pat. No. 3,699,976, microwave energy is described to kill insect infestation of tobacco. Moreover, techniques using impregnation of tobacco with inert organic liquids (U.S. Pat. No. 4,821,747) for the purposes of extracting expanded organic materials by a sluicing means have been disclosed wherein the mixture was exposed to microwave energy. In another embodiment, microwave energy is disclosed as the drying mechanism of extruded tobacco-containing material (U.S. Pat. No. 4,874,000). In U.S. Pat. No. 3,773,055, Stungis discloses the use of microwave to dry and expand cigarettes made with wet tobacco.

Prior attempts to reduce tar and harmful carcinogenic nitrosamines primarily have included the use of filters in smoking tobacco. In addition, attempts have been made to use additives to block the effects of harmful carcinogens in tobacco. These efforts have failed to reduce the oncologic morbidity associated with tobacco use. It is known that fresh-cut, green tobacco has virtually no nitrosamine carcinogens. See, e.g., Wiernik et al, "Effect of Air-Curing on the Chemical Composition of Tobacco," Recent Advances in Tobacco Science, Vol. 21, pp. 39 et seq., Symposium Proceedings 49th Meeting Tobacco Chemists' Research Conference, Sept. 24–27, 1995, Lexington, Kentucky (hereinafter "Wiernik et al"). However, cured tobacco is known to contain a number of nitrosamines, including the harmful carcinogens N'-nitrosonornicotine (NNN) and 4-(N-nitrosomethylamino)-1-(3-pyridyl)-1-butanone (NNK). It is widely accepted that such nitrosamines are formed post-harvest, during the curing process, as described further herein. Unfortunately, fresh-cut green tobacco is unsuitable for smoking or other consumption.

In 1993 and 1994, Burton et al at the University of Kentucky carried out certain experiments regarding tobacco-specific nitrosamines (TSNA), as reported in the Abstract, "Reduction of Nitrite-Nitrogen and Tobacco N'-Specific Nitrosamines In Air-Cured Tobacco By Elevating Drying Temperatures", Agronomy & Phytopathology Joint Meeting, CORESTA, Oxford 1995. Burton et al reported that drying harvested tobacco leaves for 24 hours at 71° C., at various stages of air curing, including end of yellowing (EOY), EOY+3, EOY+5, etc. resulted in some reduction of nitrosamine levels. Reference is also made to freeze drying and microwaving of certain samples, without detail or results. Applicant has confirmed that in the actual work underlying this Abstract, carried out by Burton et al at the University of Kentucky, the microwave work was considered unsuccessful. Certain aspects of Burton et al's 1993–94 study are reported in Wiernik et al, supra, at pages 54–57, under the heading "Modified Air-Curing". The Wiernik et al article postulates that subjecting tobacco leaf samples, taken at various stages of air-curing, to quick-drying at 70° C. for 24 hours, would remove excess water and reduce the growth of microorganisms; hence, nitrite and tobacco-specific nitrosamine (TSNA) accumulation would be avoided. In Table II at page 56, Wiernik et al includes some of Burton et al's summary data on lamina and midrib nitrite and TSNA contents in the KY160 and KY171 samples. Data from the freeze-drying and the quick-drying tests are included, but there is no mention of the microwaved samples. The article contains the following conclusion:

> It can be concluded from this study that it may be possible to reduce nitrite levels and accumulation of TSNA in lamina and midrib by applying heat (70° C.) to dark tobacco after loss of cell integrity in the leaf. Drying the tobacco leaf quickly at this stage of curing reduces the microbial activity that occurs during slow curing at ambient temperature. It must be added, however, that such a treatment lowers the quality of the tobacco leaf.

Id. at page 56. The Weirnik et al article also discusses traditional curing of Skroniowski tobacco in Poland as an example of a 2-step curing procedure. The article states that the tobacco is first air-cured and, when the lamina is yellow or brownish, the tobacco is heated to 65° C. for two days in order to cure the stem. An analysis of tobacco produced in this manner showed that both the nitrite and the TSNA values were low, i.e., less than 10 micrograms per gram and 0.6–2.1 micrograms per grams, respectively. Weirnik et al theorized that these results were explainable due to the rapid heating which does not allow further bacterial growth. Weirnik et al also noted, however, that low nitrite and TSNA values, less than 15 micrograms per gram of nitrite and 0.2 microgram per gram of TSNA, were obtained for tobacco subjected to air-curing in Poland.

SUMMARY OF THE INVENTION

One object of the present invention is to substantially eliminate or reduce the content of nitrosamines in tobacco intended for smoking or consumption by other means.

Another object of the present invention is to reduce the carcinogenic potential of tobacco products, including cigarettes, cigars, chewing tobacco, snuff and tobacco-containing gum and lozenges.

Still another object of the present invention is to substantially eliminate or significantly reduce the amount of tobacco-specific nitrosamines, including N'-nitrosonornicotine (NNN), 4-(N-nitrosomethylamino)-1-(3-pyridyl)-1-butanone (NNK), N'-nitrosoanatabine (NAT) and N-nitrosoanabasine (NAB), in such tobacco products.

Another object of the present invention is to treat uncured tobacco at an appropriate time post-harvest so as to arrest the curing process with out adversely affecting the tobaccos suitability for human consumption.

Another object of the present invention is to reduce the content of tobacco-specific nitrosamines in fully cured tobacco.

Yet another object of the present invention is to reduce the content of tobacco-specific nitrosamines, particularly NNN and NNK, and metabolites thereof in humans who smoke, consume or otherwise ingest tobacco in some form, by providing a tobacco product suitable for human consumption which contains a substantially reduced quantity of tobacco-specific nitrosamines, thereby lowering the carcinogenic potential of such product. Preferably, the tobacco product is a cigarette, cigar, chewing tobacco or a tobacco-containing gum or lozenge.

The above and other objects and advantages in accordance with the present invention can be obtained by a process for reducing the amount of or preventing formation of nitrosamines in a harvested tobacco plant, comprising subjecting at least a portion of the plant to microwave radiation, while said portion is uncured and in a state susceptible to having the amount of nitrosamines reduced or formation of nitrosamines arrested, for a sufficient time to reduce the amount of or substantially prevent formation of at least one nitrosamine.

It is preferred that in the process of the invention, the step of subjecting to microwave radiation is carried out on a tobacco leaf or portion thereof after onset of yellowing in the leaf and prior to substantial accumulation of tobacco-specific nitrosamines in the leaf. It is also preferred that in the process of the invention, the step of subjecting to microwave radiation is carried out prior to substantial loss of the leaf's cellular integrity.

In additional preferred embodiments of the process, the tobacco is flue tobacco and the step of subjecting to microwave radiation is carried out within about 24 to about 72 hours post-harvest, even more preferably within about 24 to about 36 hours post-harvest.

In still other embodiments of the process, the harvested tobacco is maintained under above-ambient temperature conditions in a controlled environment prior to the step of subjecting to microwave radiation.

Preferred aspects of the process include a step, prior to subjecting a tobacco leaf which preferably includes the stem to microwave radiation, of physically pressing the leaf to squeeze excess moisture therefrom, to ensure more uniform drying by the microwave unit. This step can be conveniently carried out by passing the leaf through a pair of appropriately spaced rotating cylindrical rollers prior to entering the microwave cavity.

In yet additional preferred embodiments of the invention, the microwave radiation has a frequency of about 900 to about 2500 MHz, and is applied to the plant for a period of at least about 1 second, and preferably from about 10 seconds to about 5 minutes at a predetermined power level. The power level used generally determines the length of time to which the tobacco is subjected to the microwave radiation, and can range from about 600 to about 1000 watts when using conventional kitchen-type microwave ovens, up to several hundred or more kilowatts for commercial, multimode applicators. Preferred power levels using applicators designed to handle single leaves range from about 2 to about 75 kilowatts, more preferably from about 5 to about 50 kilowatts, which permit relatively rapid treatment to be carried out.

It is also preferred in accordance with the present invention that the microwave radiation is applied to the leaf or portion thereof for a time sufficient to effectively dry the leaf, without charring, so that it is suitable for human consumption.

The present invention also seeks to subject tobacco leaves to microwave radiation to prevent normal accumulation of at least one tobacco-specific nitrosamine, such as N'-nitrosonornicotine, 4-(N-nitrosomethylamino)-1-(3-pyridyl)-1-butanone, N'-nitrosoanatabine and N'-nitrosoanabasine.

The present invention in its broadest forms also encompasses a tobacco product comprising non-green tobacco suitable for human consumption and having a lower content of at least one tobacco-specific nitrosamine than conventionally cured tobacco.

In preferred embodiments, the non-green tobacco product has a TSNA (NNN, NNK, NAB and NAT) content of less than 0.2 $\mu$g/g, more preferably less than about 0.15 $\mu$g/g, and even more preferably less than about 0.1 $\mu$g/g, an NNN content of less than about 0.15 $\mu$g/g, more preferably less than about 0.10 $\mu$g/g, and even more preferably less than about 0.05 $\mu$g/g, and an NNK content of less than about 0.002 $\mu$g/g, more preferably less than about 0.001 $\mu$g/g, and even more preferably less than about 0.0005 $\mu$g/g.

The present invention is also directed to a tobacco product comprising dried yellow tobacco suitable for human consumption and having a lower content of at least one tobacco-specific nitrosamine than conventionally cured tobacco. In preferred embodiments, the yellow tobacco product has a TSNA (NNN, NNK, NAB and NAT) content, an NNN content, and an NNK content within the above preferred ranges.

In other embodiments, the non-green or yellow tobacco product comprises non-green or yellow tobacco suitable for human consumption, and having a TSNA (NNN, NNK, NAB and NAT) content within about 25% by weight of the content of such TSNA in the freshly harvested green tobacco crop from which the product was made. It is more preferred that the non-green or yellow tobacco product have a TSNA content within about 10% by weight, more preferably within about 5% by weight and most preferably essentially approximating (e.g. within an amount up to several percent by weight) the content of such TSNA in the freshly harvested tobacco crop from which the product was made. It is also preferred that the non-green or yellow tobacco product comprises non-green or yellow tobacco suitable for human consumption, and having content of at least one TSNA selected from NNN, NNK, NAB and NAT, which is within about 25% by weight, preferably within about 10% by weight, more preferably within about 5% by weight and most preferably essentially approximating (e.g. within an amount up to several percent by weight) of the content of the corresponding TSNA or TSNAs in the freshly harvested green tobacco crop from which the product was made.

In yet additional embodiments of the invention, the non-green or yellow tobacco product comprises non-green or yellow tobacco suitable for human consumption, and having a TSNA (NNN, NNK, NAB and NAT) content which is at least about 75% by weight, preferably at least about 90% by weight, more preferably at least about 95% by weight, and most preferably at least about 99% by weight lower than the content of such TSNA in a tobacco product of the same type made from the same tobacco crop as the product of the invention, but which was cured in the absence of microwave radiation or other techniques designed to reduce TSNA content. It is also preferred that the non-green or yellow tobacco product comprises non-green or yellow tobacco suitable for human consumption, and having a content of at least one TSNA selected from NNN, NNK, NAB and NAT which is at least about 75% by weight, preferably at least about 90% by weight, more preferably at least about 95% by weight, and most preferably at least about 99% by weight lower than the content of the corresponding TSNA or TSNAs in a tobacco product of the same type made from the same tobacco crop as the product of the invention, but which was cured in the absence of microwave radiation or other techniques designed to reduce TSNA content.

A preferred form of the present invention relates to a tobacco product comprising tobacco having a reduced content of at least one tobacco-specific nitrosamine, produced by a process comprising subjecting the tobacco, while the tobacco is uncured and susceptible to having formation of at least one tobacco-specific nitrosamine arrested, to microwave radiation.

In another embodiment, the present invention is directed to a method for reducing the content of at least one tobacco-specific nitrosamine in cured brown tobacco, comprising rehydrating the cured brown tobacco, and subjecting the rehydrated tobacco to microwave radiation at a predetermined energy level for a predetermined length of time.

Similarly, the present invention includes within its scope a tobacco product comprising cured brown tobacco having a reduced content of at least one tobacco-specific nitrosamine, produced by a process comprising rehydrating the cured brown tobacco, and subjecting the rehydrated tobacco to microwave radiation at a predetermined energy level for a predetermined length of time.

In yet another embodiment, the present invention relates to a method of manufacturing a tobacco product, comprising subjecting harvested tobacco leaves to microwave radiation, while said leaves are uncured and in a state susceptible to having the amount of tobacco-specific nitrosamines reduced or formation of tobacco-specific nitrosamines arrested, for a sufficient time to reduce the amount of or substantially prevent formation of at least one tobacco-specific nitrosamine in the leaves, and forming the tobacco product comprising the microwaved leaves, the tobacco product being selected from cigarettes, cigars, chewing tobacco, snuff and tobacco-containing gum and lozenges.

It has also been discovered that forms of electromagnetic radiation having higher frequencies and shorter wavelengths than the microwave domain discussed above and in more detail below, can be used to achieve the basic objects of the present invention—reduction or substantial elimination of TSNAs in tobacco products, by treating the tobacco with such energy forms in the same time frame post-harvest as discussed above with regard to the microwave embodiment. Thus, the present invention also relates to a method for reducing the amount of or preventing formation of nitrosamines in a harvested tobacco plant, comprising subjecting at least a portion of the plant to radiation having a frequency higher than the microwave domain, while said portion is uncured and in a state susceptible to having the amount of nitrosamines reduced or formation of nitrosamines arrested, for a sufficient time to reduce the amount of or substantially prevent formation of at least one nitrosamine.

As with the microwave embodiments, it is preferred that in the process of the invention, the step of subjecting to radiation having a frequency higher than the microwave domain is carried out on a tobacco leaf or portion thereof after onset of yellowing in the leaf and prior to substantial accumulation of tobacco-specific nitrosamines in the leaf. It is also preferred that in the process of the invention, the step of subjecting to such radiation is carried out prior to substantial loss of the leaf's cellular integrity. Preferred energy sources capable of producing such radiation are described further below, and include far-infrared and infrared radiation, UV (ultraviolet radiation), soft x-rays or lasers, accelerated particle beams such as electron beams, x-rays and gamma radiation.

Figure 1:
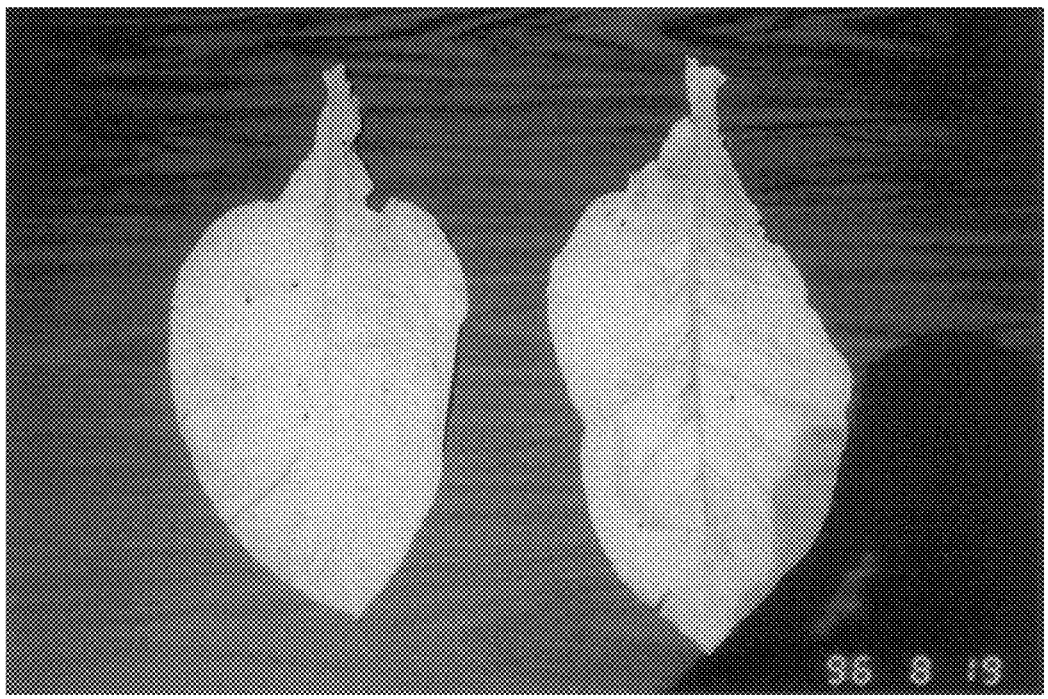
FIG. 1 is a photograph illustrating "yellow" Virginia flue tobacco aged 24 to 72 hours post-harvest.

The file of this patent contains at least one color drawing. Copies of this patent with color drawings will be provided by the Patent and Trademark upon request and payment of the necessary fee.

DETAILED DESCRIPTION OF THE INVENTION

It has been said that the practice of tobacco curing is more of an art than a science, because curing conditions during any given cure must be adjusted to take into account such factors as varietal differences, differences in leaves harvested from various stalk positions, differences among curing barns where used, and environmental variations during a single season or over different seasons, especially weather fluctuations when air-curing. For example, the practice of flue curing is empirical to a certain degree, and is optimally carried out by individuals who have accumulated experience in this art over a significant period of time. See, e.g., Peele et al, "Chemical and Biochemical Changes During The Flue Curing Of Tobacco," Recent Advances In Tobacco Science, Vol. 21, pp. 81 et seq., Symposium Proceedings 49th Meeting Chemists' Research Conference, Sep. 24–27, 1995, Lexington, Ky. (hereinafter "Peele et al"). Thus, one of ordinary skill in the art of tobacco curing would understand that the outer parameters of the present invention, in its broadest forms, are variable to a certain extent depending on the precise confluence of the above factors for any given harvest.

In one preferred embodiment, the present invention is founded on the discovery that a window exists during the tobacco curing cycle, in which the tobacco can be treated in a manner that will essentially prevent the formation of TSNA. Of course, the precise window during which TSNA formation can be effectively eliminated or substantially reduced depends on the type of tobacco, method of curing, and a number of other variables, including those mentioned above. In accordance with this preferred embodiment of the present invention, the window corresponds to the time frame post-harvest when the leaf is beyond the fresh-cut or "green" stage, and prior to the time at which TSNAs and/or nitrites substantially accumulate in the leaf; this time frame typically corresponds to the period in which the leaf is undergoing the yellowing process or is in the yellow phase, before the leaf begins to turn brown, and prior to the substantial loss of cellular integrity. Unless otherwise clear from the context, the terms "substantial" and "significant" as used herein generally refer to predominant or majority on a relative scale, give or take. During this time frame, the leaves are susceptible to having the formation of TSNAs substantially prevented, or the content of any already formed TSNAs reduced, by exposing the tobacco to microwave radiation at a predetermined energy level for a predetermined length of time, as discussed further below. This microwave treatment essentially arrests the natural formation of TSNAs, and provides a dried, golden yellow leaf suitable for human consumption. If TSNAs have already begun to substantially accumulate, typically toward the end of the yellow phase, the application of microwave energy to the leaf in accordance with the invention effectively arrests the natural TSNA formation cycle, thus preventing any further substantial formation of TSNA. When yellow or yellowing tobacco is treated in this fashion at the most optimal time in the curing cycle, the resulting tobacco product has TSNA levels essentially approximating those of freshly harvested green tobacco, while maintaining its flavor and taste.

In another embodiment, the present invention relates to treatment of cured (brown) tobacco to effectively reduce the TSNA content of that cured tobacco, by rehydrating cured tobacco and subjecting the rehydrated cured tobacco to microwave radiation, as described further below.

The present invention is applicable to treatment of the harvested tobacco which is intended for human consumption. Much research has been performed on tobacco, with particular reference to tobacco-specific nitrosamines. Freshly harvested tobacco leaves are called "green tobacco" and contain no known carcinogens, but green tobacco is not suitable for human consumption. The process of curing green tobacco depends on the type of tobacco harvested. For example, Virginia flue (bright) tobacco is typically flue-cured, whereas Burley and certain dark strains are usually air-cured. The flue-curing of tobacco typically takes place over a period of five to seven days compared to one to two+ months for air-curing. According to Peele et al, flue-curing has generally been divided into three stages: yellowing (35–40° C.) for about 36–72 hours (although others report that yellowing begins sooner than 36 hours, e.g., at about 24 hours for certain Virginia flue strains), leaf drying (40–57° C.) for 48 hours, and midrib (stem) drying (57–75° C.) for 48 hours. Many major chemical and biochemical changes begin during the yellowing stage and continue through the early phases of leaf drying.

In a typical flue-curing process, the yellowing stage is carried out in a barn. During this phase the green leaves gradually lose color due to chlorophyll degradation, with the corresponding appearance of the yellow carotenoid pigments. According to the review by Peele et al, the yellowing stage of flue-curing tobacco is accomplished by closing external air vents in the barn, and holding the temperature at approximately 35–37° C. This process utilizes a controlled environment, maintains the relative humidity in the barn at approximately 85%, limits moisture loss from the leaves, and allows the leaf to continue the metabolic processes begun in the field. The operator constantly monitors the progress of the cure, primarily by observing the loss of chlorophyll and green color from the leaves, and the development of the desired lemon to golden orange leaf color.

With one particular variety of Virginia flue tobacco on which testing has been carried out as described herein, freshly harvested green tobacco is placed in a barn for about 24–48 hours at about 100–110° F. until the leaves turn more or less completely yellow (see FIG. 1). The yellow tobacco has a reduced moisture content, i.e., from about 90 weight % when green, versus about 70–40 weight % when yellow. At this stage, the yellow tobacco contains essentially no known carcinogens, and the TSNA content is essentially the same as in the fresh-cut green tobacco. This Virginia flue tobacco typically remains in the yellow stage for about 6–7 days, after which time the leaves turn from yellow to brown. The brown Virginia flue tobacco typically has a moisture content of about 11 to about 15 weight percent. The conversion of the tobacco from yellow to brown results in formation and substantial accumulation of nitrosamines, and an increased microbial content. The exact mechanism by which tobacco-specific nitrosamines are formed is not clear, but is believed to be enhanced by microbial activity, involving microbial nitrate reductases in the generation of nitrite during the curing process.

Tobacco-specific nitrosamines are believed to be formed upon reaction of amines with nitrite-derived nitrosating species, such as $NO_2$, $N_2O_3$ and $N_2O_4$ under acidic conditions. Weirnik et al discuss the postulated formation of TSNAs at pp. 43–45; a brief synopsis is set forth below.

Tobacco leaves contain an abundance of amines in the form of amino acids, proteins, and alkaloids. The tertiary amine nicotine (referenced as (1) in the diagram below) is the major alkaloid in tobacco, while other nicotine-type alkaloids are the secondary amines nornicotine (2), anatabine (3) and anabasine (4). Tobacco also generally contains up to 5% of nitrate and traces of nitrite.

Nitrosation of nornicotine (2), anatabine (3), and anabasine (4) gives the corresponding nitrosamines: N'-nitrosonornicotine (NNN, 5), N'-nitrosoanatabine (NAT, 6), and N'-nitrosonabasine (NAB, 7). Nitrosation of nicotine (1) in aqueous solution affords a mixture of 4-(N-nitrosomethylamino)-1-(3-pyridyl)-1-butanone (NNK, 8) (NNN, 5) and 4-(N-nitrosomethylamino)-4-(3-pyridyl)-1-butanal (NNA, 9). Less commonly encountered TSNAs include NNAL (4-N-nitrosomethylamino)-1-(3-pyridyl)-1-butanol, 10), iso-NNAL (4-N-nitrosomethylamino)-4-(3-pyridyl)-1-butanol, 11) and iso-NNAC (4-(N-nitrosomethylamino)-4-(3-pyridyl)-butanoic acid, 12). The formation of these TSNAs from the corresponding tobacco alkaloids is shown schematically below, using the designations 1–12 above (reproduced from Weirnik et al, supra, p. 44):

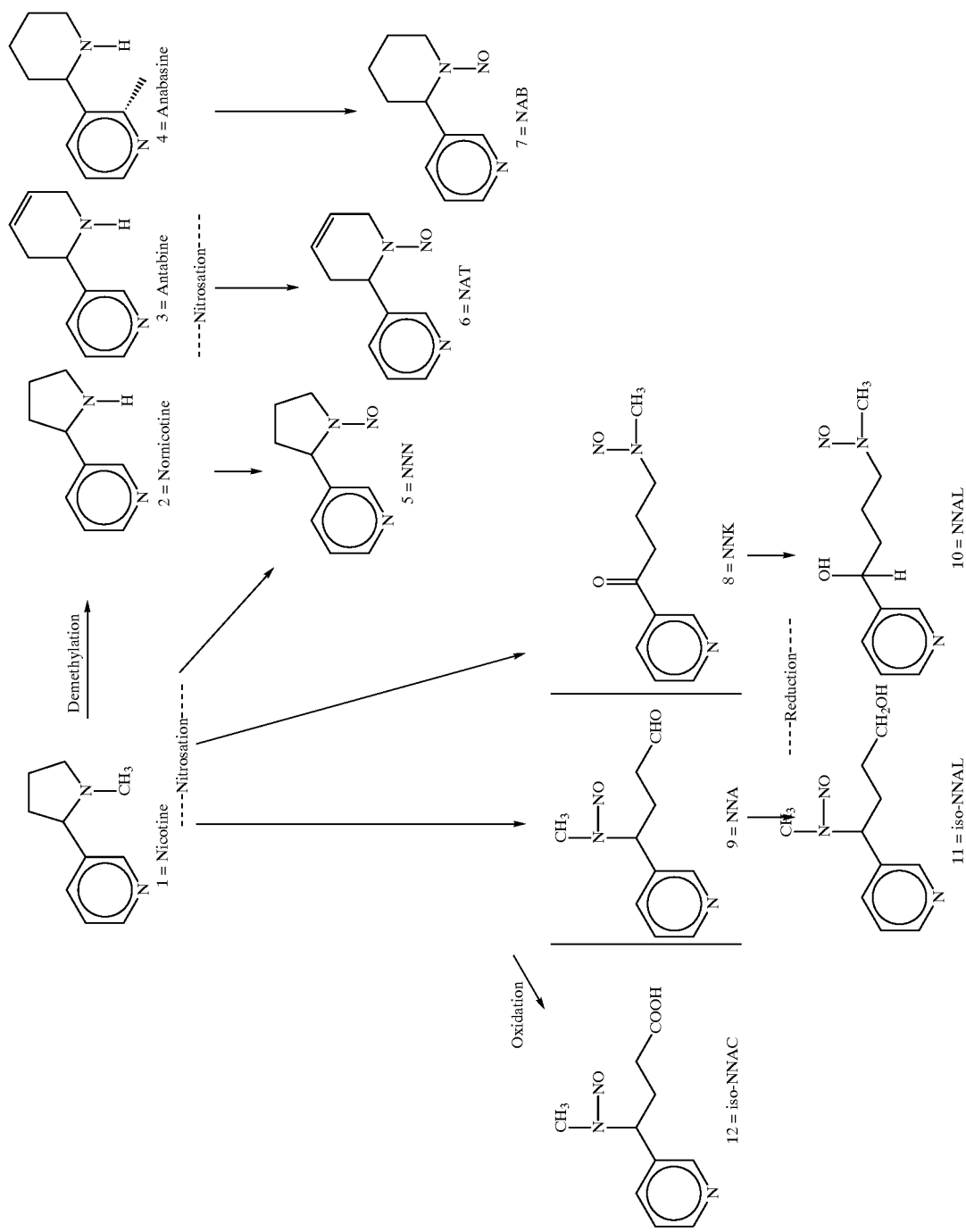

It is now generally agreed that green, freshly harvested tobacco contains virtually no nitrite or TSNA, and that these compounds are generated during curing and storage of tobacco. Studies have been made during the past decade to try to determine the events related to the formation of TSNA during curing of tobacco, and several factors of importance have been identified. These include plant genotype, plant maturity at harvest, curing conditions and microbial activity.

Studies have shown that nitrite and TSNA accumulate on air-curing at the time intervals starting after the end of yellowing and ending when the leaf turns completely brown, e.g., 2–3 weeks after harvest for certain air-cured strains, and approximately a week or so after harvest in flue-cured varieties. This is the time during which loss of cellular integrity occurs, due to moisture loss and leakage of the content of cells into the intercellular spaces. Therefore, there is a short window in time during air-curing when the cells have disintegrated, making the nutrition available for microorganisms. Weirnik et al have suggested that nitrite may then substantially accumulate as a result of dissimilatory nitrate reduction, thus rendering formation of TSNA possible.

There are a few published reports on the effects of microbial flora on the tobacco leaf during growth and curing and on cured tobacco, as cited in Weirnik et al. However, the involvement of microbial nitrite reductases in the generation of nitrate during curing is presumed. When cell structure is broken down after the yellow phase, and nutrients are made accessible to invading microorganisms, these may produce nitrite under favorable conditions, i.e., high humidity, optimal temperature and anoxia. There is normally a rather short "window" in time when the water activity is still sufficiently high, and the cell structure has disintegrated.

In accordance with the present invention, the formation of TSNAs in tobacco is substantially prevented or arrested by subjecting the harvested leaves to microwave radiation under the conditions described herein. In one preferred embodiment, the tobacco leaves are exposed to the microwave energy at a time between the onset of yellowing and the substantial loss of cellular integrity. For optimal results, it is preferred to pass the harvested leaves through the microwave field as single leaves, as opposed to stacks or piles of leaves. Treating the leaves in this manner has been determined to completely or substantially prevent the formation of tobacco-specific nitrosamines, including the known carcinogens NNN and NNK.

In accordance with preferred embodiments of the present invention, non-green and/or yellow tobacco products can be obtained which are suitable for human consumption, and which have a lower content of at least one tobacco-specific nitrosamine than conventionally cured tobacco. Green or fresh-cut tobacco is generally unsuitable for human consumption as noted above; "non-green" as used herein means means the tobacco has at least lost the majority of chlorophyll, and includes without limitation partially yellow leaves, full yellow leaves, and leaves which have begun to turn brown in places. In preferred embodiments, the non-green tobacco product has a TSNA (NNN, NNK, NAB and NAT) content of less than 0.2 $\mu g/g$, more preferably less than about 0.15 $\mu g/g$, and even more preferably less than about 0.1 $\mu g/g$, an NNN content of less than about 0.15 $\mu g/g$, more preferably less than about 0.10 $\mu g/g$, and even more preferably less than about 0.05 $\mu g/g$, and an NNK content of less than about 0.002 $\mu g/g$, more preferably less than about 0.001 $\mu g/g$, and even more preferably less than about 0.0005 $\mu g/g$. As noted above, given the number of factors which can influence TSNA formation in tobacco, one of ordinary skill in the art would understand that these numbers are not absolute, but rather preferred ranges.

The present invention is also directed to a tobacco product comprising dried yellow tobacco suitable for human consumption and having a lower content of at least one tobacco-specific nitrosamine than conventionally cured tobacco. In preferred embodiments, the yellow tobacco product has a TSNA (NNN, NNK, NAB and NAT) content, an NNN content, and an NNK content within the above preferred ranges.

In other embodiments, the non-green or yellow tobacco product comprises non-green or yellow tobacco suitable for human consumption, and having a TSNA (NNN, NNK, NAB and NAT) content within about 25% by weight of the content of such TSNA in the freshly harvested green tobacco crop from which the product was made. It is more preferred that the non-green or yellow tobacco product have a TSNA content within about 10% by weight, more preferably within about 5% by weight and most preferably essentially approximating (e.g. within an amount up to several percent by weight) the content of such TSNA in the freshly harvested tobacco crop from which the product was made. For example, the present invention permits tobacco products to be made which have a TSNA content within the above-described ranges as to amounts, whereas normally cured tobacco from the same crop would typically generate many times the amount of TSNA in the fresh-cut tobacco. The present invention can effectively lock in the low amounts of nitrosamines found in fresh-cut green tobacco. It is also preferred that the non-green or yellow tobacco product comprises non-green or yellow tobacco suitable for human consumption, and having content of at least one TSNA selected from NNN, NNK, NAB and NAT, which is within about 25% by weight of, preferably within about 10% by weight of, more preferably within about 5% by weight of, and most preferably essentially approximating (e.g., within an amount up to several percent by weight) the content of the corresponding TSNA or TSNAs in the freshly harvested green tobacco crop from which the product was made. In other words, the content of, e.g., NNN in the tobacco of the invention falls within the above ranges vis-a-vis the amount of NNN in the fresh-cut green tobacco, or the amount of NNN+NNK in the tobacco of the invention falls within the above ranges vis-a-vis the amount of NNN+NNK in the fresh-cut green tobacco, etc. In making these comparisons, the fresh-cut green tobacco is preferably analyzed for TSNA content within about 24 hours after harvest.

In yet additional embodiments of the invention, the non-green or yellow tobacco product comprises non-green or yellow tobacco suitable for human consumption, and having a TSNA (NNN, NNK, NAB and NAT) content which is at least about 75% by weight, preferably at least about 90% by weight, more preferably at least about 95% by weight, and most preferably at least about 99% by weight lower than the content of such TSNA in a tobacco product of the same type made from the same tobacco crop as the product of the invention, but which was cured in the absence of microwave radiation or other steps specifically designed to reduce the TSNA content. It is also preferred that the non-green or yellow tobacco product comprises non-green or yellow tobacco suitable for human consumption, and having a content of at least one TSNA selected from NNN, NNK, NAB and NAT which is at least about 75% by weight, preferably at least about 90% by weight, more preferably at least about 95% by weight, and most preferably at least about 99% by weight lower than the content of the corresponding TSNA or TSNAs in a tobacco product of the same type (e.g., comparing a cigarette to another cigarette) made from the same tobacco crop as the product of the invention, but which was cured in the absence of microwave radiation or other techniques for reducing TSNA content. In these embodiments, the TSNA weight % comparisons can be made by taking, for example, a cigarette made using dried yellow tobacco in accordance with the present invention, and taking a cigarette made from tobacco from the same crop as the dried yellow tobacco was made from, but curing it by conventional means without subjecting it to microwave radiation.

The yellow stage, in which the step of subjecting the tobacco leaf to microwave radiation is preferably carried out, can be broadly defined in any one of the following ways: (a) by examining the color of the leaf, when the green color has substantially given way to a yellowish color; (b) by measuring the percent of chlorophyll conversion to sugars; (c) by observing the onset of either nitrite formation or nitrosamine generation, which typically coincide with the end of the yellow phase, or (d) by measuring the moisture content of the leaves, e.g., when they have a moisture content from about 40 to about 70 percent by weight. If the microwave radiation is applied to green tobacco, the arrestation or prevention of nitrosamine formation is not observed. However, when microwave energy is applied after the onset of yellowing and prior to the loss of cellular integrity or substantial accumulation of TSNAs in the leaf, the observed reduction in the amount of, or prevention of formation of nitrosamines is dramatic and unexpected, as shown by the data discussed below.

The optimal time for subjecting the harvested tobacco to the microwave radiation during the yellow phase varies depending on a number of factors, including varietal differences, environmental variations, etc. Thus, within the time frame beginning with onset of yellowing (defined, e.g., by a loss of the majority of green color in the leaf) through the time at which the leaf substantially loses cellular integrity (as it turns brown), one of ordinary skill in the art could determine the optimal time for carrying out the microwave treatment for any given variety of tobacco. For example, for a given genotype, sample leaves could be tested by the procedures described herein to measure either nitrite or TSNA content, to identify the relative time in a given cure cycle at which significant TSNA accumulation begins, or identify the transition phase in which loss of cellular integrity occurs. While subjecting the leaves to the microwave radiation prior to significant TSNA accumulation is the most preferred form of the method of the present invention, the principles of the invention can also be applied to tobacco leaves which are in the process of forming, and have already accumulated significant amounts of TSNAs. When the microwaving is carried out at this latter stage, further formation of TSNAs can be effectively arrested. However, once the leaves are fully cured, TSNA levels have essentially stabilized, and application of microwave radiation is ineffective to reduce the TSNA context, except under rehydration conditions described below.

Upon being subjected to microwave radiation in accordance with the present invention, the tobacco leaf generally has a reduced moisture content, i.e. less than about 10% by weight, and often approximately 5%. If desired, the leaf can be rehydrated back to the typical moisture range for brown, cured tobacco (e.g., about 11–15% for Virginia flue) before manufacturing into tobacco products such as cigarettes.

The present invention is applicable to all strains of tobacco, including flue or bright varieties, Burley varieties, dark varieties, oriental/Turkish varieties, etc. Within the guidelines set forth herein, one of ordinary skill in the art could determine the most efficient time in the cure cycle for carrying out the microwave step to achieve the objects and advantages of the present invention.

Preferred aspects of the process include a step, prior to subjecting a tobacco leaf which preferably includes the stem to microwave radiation, of physically pressing the leaf to squeeze excess moisture therefrom, to ensure more uniform drying by the microwave unit. This step can be conveniently carried out by passing the leaf through a pair of appropriately spaced rotating cylindrical rollers prior to entering the microwave cavity. Such a pressing step will aid in wringing moisture from the stem and, to a lesser extent, the midrib and larger veins, and lead to a better and more evenly dried product. The rollers can be made of hard rubber, plastic or steel and be of any desired length, and are preferably spaced about one-eighth to about one-quarter inch apart, but the distance is preferably selected so as to accomodate the thickness of a single leaf, which can vary. The rollers can be belt or chain driven by an appropriately selected motor. Besides rotating rollers, other types of squeezing or pressing means could be used to accomplish the same result, if desired, as would be apparent to one of ordinary skill in the art.

The above-described preferred embodiment of pressing the leaves permits more high-speed production to be carried out, since the stems do not have to be cut out, and the microwave time can be reduced. This embodiment is particularly advantageous for tobacco leaves destined to be used in cigarettes, which typically contain some tobacco stems as part of a blend. Alternatively, the pressing step can be omitted if desired, in applications where the stem is trimmed from the leaves and discarded.

In another preferred embodiment, instead of pressing the leaves or cutting out the stems, the leaves can be subjected to a steam treatment prior to microwaving. As with the pressing step, steaming the whole leaves, including the stems, has been demonstrated to more evenly distribute the moisture in the stems and larger veins, thus leading to more uniform drying of the entire leaves upon microwaving. As a result, the entire leaves including the stems can be used in tobacco products when this particular technique is employed. Although the details would be apparent to one of ordinary skill in the art, successful results have been obtained when the leaves have been placed in a suitable steam vessel for a time sufficient to allow the leaves to become somewhat soft and pliable, generally from about 30 seconds up to about five minutes.

The principles of the present invention can also be applied to brown or already cured tobacco, which has been rehydrated. In such cases, while important and unexpected reductions in the amount of the TSNAS, particularly NNN and NNK, are observed when rehydrated brown tobacco is subjected to microwave radiation, the results are not as dramatic as when the invention is applied to uncured yellow tobacco, prior to the time when substantial quantities of TSNAs or nitrites have accumulated in the leaves. Nonetheless, the addition of moisture to the cured leaves, such as by spraying with enough water to effectively soak the leaves, followed by microwaving the rehydrated leaves, reduces the content of TSNAs as demonstrated in the following Examples.

As noted above, when treating cured or brown tobacco, microwaving alone has little effect on the nitrosamine content. However, it has been determined that rehydration of the cured tobacco prior to subjecting it to microwave radiation facilitates the action of the microwave energy in reducing nitrosamines. In one preferred embodiment, the cured tobacco product is rehydrated by adding an appropriate amount of water, generally at least about 10% by weight, up to the maximum absorption capacity, directly to the leaves. Exposure of the rehydrated leaves to microwave radiation, in the same manner as described herein with regard to the uncured tobacco, reduces the nitrosamine content, as shown below. The leaves can be wetted in any suitable fashion. If the cured tobacco is in a form other than leaves, such as reconstituted "sheet" tobacco, it can similarly be rehydrated with, e.g., 10–70% by weight water, and then microwaved. Suitable microwave condition can be selected depending on the degree to which the leaves are re- wetted, but typically fall within the parameters discussed above for microwaving yellow tobacco.

In accordance with the present invention, microwaving of the rehydrated brown tobacco can preferably reduce the TSNA (NNN, NNK, NAB and NAT) content, measured individually or collectively, by at least about 25% by weight, more preferably by at least about 35% by weight, and even more preferably by at least about 50% by weight from the TSNA levels contained the cured brown tobacco prior to rehydration.

The term "microwave radiation" as used herein refers to electromagnetic energy in the form of microwaves having a frequency and wavelength typically characterized as falling within the microwave domain. The term "microwave" generally refers to that portion of the electromagnetic spectrum which lies between the far-infrared region and the conventional radiofrequency spectrum. The range of microwaves extends from a wavelength of approximately 1 millimeter and frequency of about 300,000 MHz to wavelength of 30 centimeters and frequency of slightly less than about 1,000 MHz. The present invention preferably utilizes high power applications of microwaves, typically at the lower end of this frequency range. Within this preferred frequency range, there is a fundamental difference between a heating process by microwaves and by a classical way, such as by infrared (for example, in cooking): due to a greater penetration, microwaves generally heat quickly to a depth several centimeters while heating by infrared is much more superficial. In the United States, commercial microwave apparatuses, such as kitchen microwave ovens, are available at standard frequencies of approximately 915 MHz and 2450 MHz, respectively. These frequencies are standard industrial bands. In Europe, microwave frequencies of 2450 and 896 MHz are commonly employed. Under properly balanced conditions, however, microwaves of other frequencies and wavelengths would be useful to achieve the objects and advantages of the present invention.

Microwave energy can be generated at a variety of power levels, depending on the desired application. Microwaves are typically produced by magnatrons, at power levels of 600–1000 watts for conventional kitchen-level microwave apparatuses (commonly at about 800 watts), but commercial units are capable of generating power up to several hundred kilowatts, generally by addition of modular sources of about 1 kilowatt. A magnatron can generate either pulsed or continuous waves of suitably high frequency.

The applicator (or oven) is a necessary link between the microwave power generator and the material to be heated. For purposes of the present invention, any desired applicator can be used, so long as it is adapted to permit the tobacco plant parts to be effectively subjected to the radiation. The applicator should be matched to the microwave generator to optimize power transmission, and should avoid leakage of energy towards the outside. Multimode cavities (microwave ovens), the dimensions of which can be larger than several wavelengths if necessary for large samples, are useful. To ensure uniform heating in the leaves, the applicator can be equipped with a mode stirrer (a metallic moving device which modifies the field distribution continuously), and with a moving table surface, such as a conveyor belt. The best results are attained by single leaf thickness exposure to microwave radiation, as opposed to stacks or piles of leaves.

In preferred embodiments of the invention, the microwave conditions comprise microwave frequencies of about 900 MHz to about 2500 MHz, more preferably about 915 MHz and about 2450 MHz, power levels of from about 600 watts up to 300 kilowatts, more preferably from about 600 to about 1000 watts for kitchen-type applicators and from about 2 to about 75 kilowatts, more preferably from about 5 to about 50 kilowatts, for commercial multimode applicators. The heating time generally ranges from at least about 1 second, and more generally from about 10 seconds up to about 5 minutes. At power levels of about 800–1000 watts the heating time is preferably from about 1 minute to about 2½ minutes when treating single leaves as opposed to piles or stacks. For commercial-scale applicators using higher power levels in the range of, e.g., 2–75 kilowatts, heating times would be lower, ranging from about 5 seconds up to about 60 seconds, and generally in the 10–30 second range at, say, 50 kilowatts, again for single leaves as opposed to piles or stacks. Of course, one of ordinary skill in the art would understand that an optimal microwave field density could be determined for any given applicator based on the volume of the cavity, the power level employed, and the amount of moisture in the leaves. Generally speaking, use of higher power levels will require less time during which the leaf is subjected to the microwave radiation.

However, the above-described conditions are not absolute, and given the teachings of the present invention, one of ordinary skill in the art would be able to determine appropriate microwave parameters. The microwave radiation is preferably applied to the leaf or portion thereof for a time sufficient to effectively dry the leaf, without charring, so that it is suitable for human consumption. It is also preferred to apply the microwave radiation to the leaf or portion thereof for a time and at a power level sufficient to reduce the moisture content to below about 20 % by weight, more preferably about 10% by weight.

Figure 3:
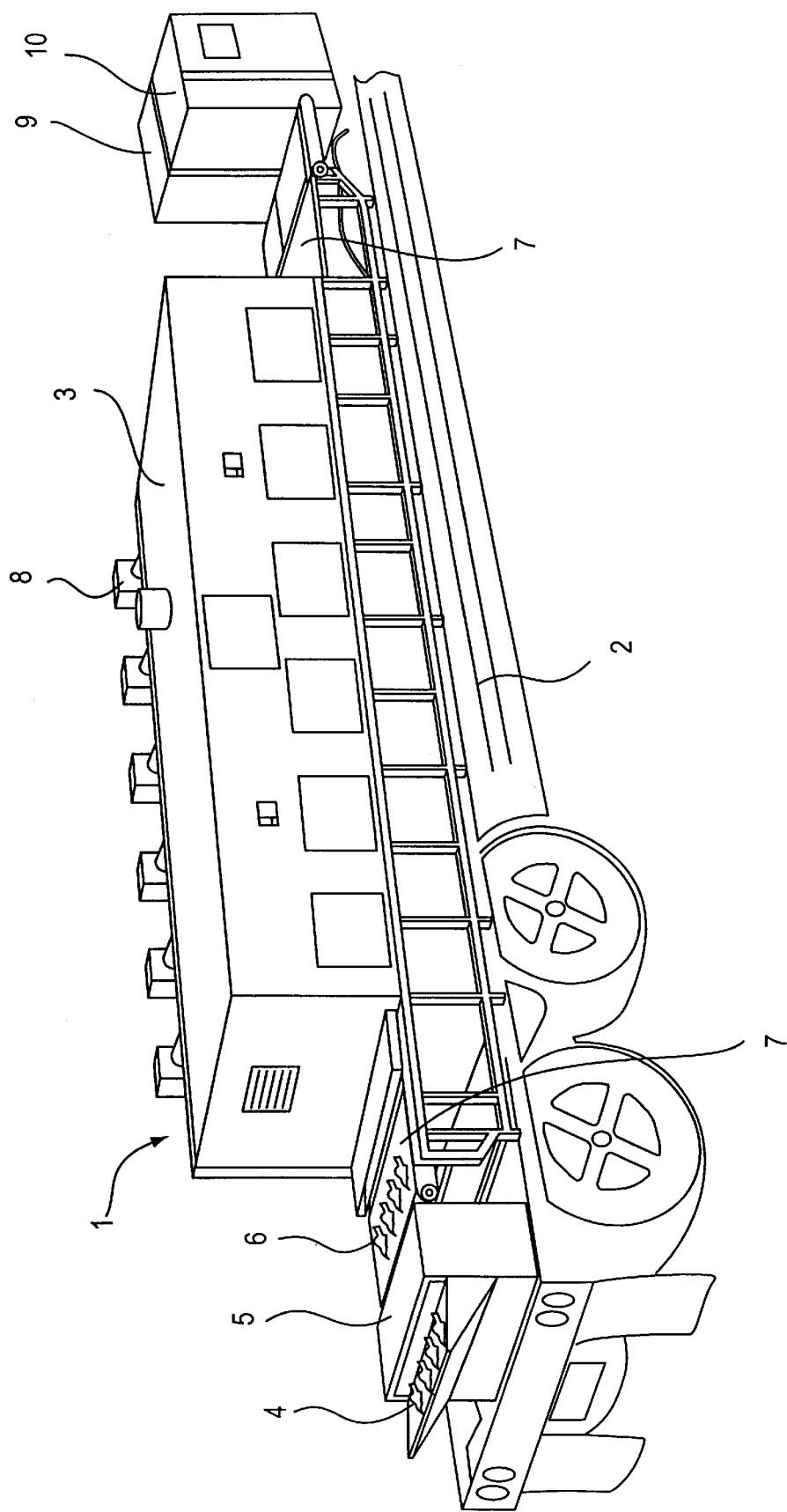
FIG. 3 is a partial, side-perspective illustration of a mobile, commercial-scale microwave applicator which can be employed to carry out the microwave treatment in accordance with the present invention.
Figure 4:
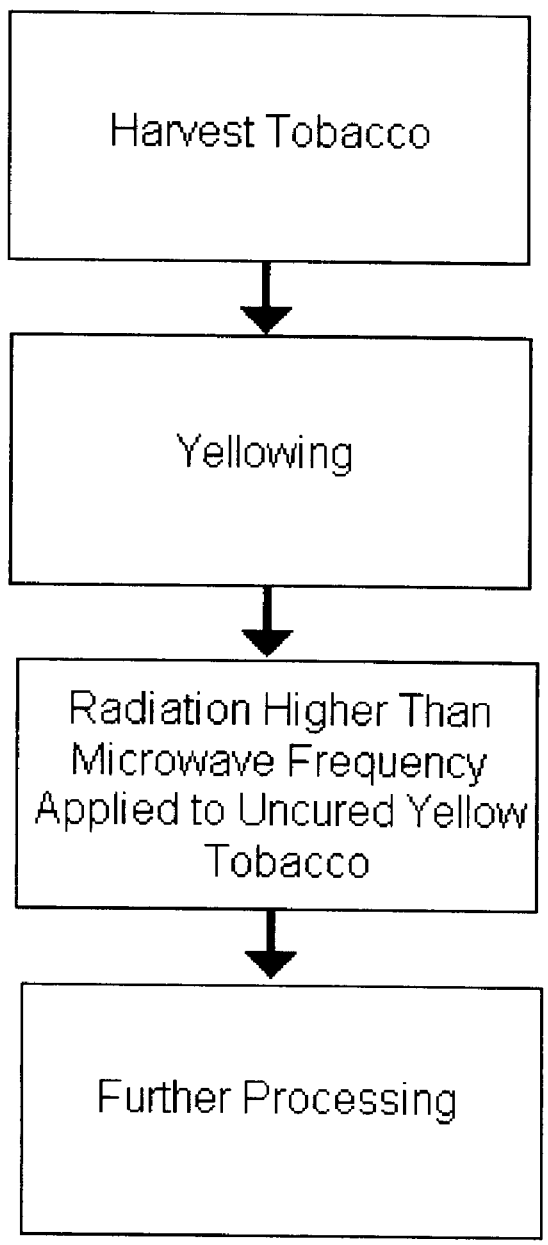
FIG. 4 is a schematic illustration of a process of treating uncured tobacco with a concentrated form of radiation having a frequency higher than the microwave region of the electromagnetic spectrum in accordance with one embodiment of the present invention.

Referring now to FIG. 3, an embodiment of a commercial scale microwave applicator is depicted in partial, perspective view. In particular, a Microdry 300 kW microwave tobacco drying system 1 is shown, comprising a mobile truck frame 2 (front end at right side of drawing not shown), a conveyorized microwave oven 3 which interiorly includes four modular oven cavities of single wall construction (which can be suitably constructed from 3003H14 aluminum), each cavity measuring approximately 16' in length× 84" in width×48" in height. Each cavity is equipped with four access doors located two per side. The doors are double interlocked to prevent accidental exposure to microwave energy.

In FIG. 3, an automatic cutting mechanism 5 is shown, including multiple (e.g., twelve) rotating blades for removing the stem from the leaves 4. The cutter can be a straight strip approximately 3.4" in width down the center of the leaves, manually fed. An appropriate guard can be provided, if desired, to prevent insertion of operators' hands. Although FIG. 3 depicts a stem cutting mechanism, as noted above the whole leaves can be used in accordance with other embodiments of the invention. Thus, in place of the cutting mechanism, the apparatus could employ a steam vessel or a pair of rollers for pressing moisture from the leaves.

Returning to FIG. 3, after the stem cutting operation the cut tobacco leaves 6 are conveyed by a belt conveyor 7 to the main microwave oven 3 housing the four cavities. In one embodiment, the system has an oven length of approximately 78 feet. Leading into and within the oven, the conveyor system can alternatively comprise multiple, e.g., six, variable speed polypropylene belts arranged in such a way so as to allow the cut stems to fall from between the pairs of belts and into a hopper located below the belts (not shown). The belts will then carry the cut tobacco leaves through one of two traps located one at each of the cavities, designed to contain the microwave energy, and then into a selected cavity where each leaf is subjected to microwaving in accordance with the principles of the invention described above. After being microwaved, the conveyor carries the leaves through the cavity exit, through an oven discharge trap and out of the oven where they are then conveyed into appropriate vessels to be taken for further processing.

To remove the moisture laden air from the cavities and oven, an exhaust system including suitable blowers providing recirculating air can be included in the system (see moisture exhaust vents, item 8 being one labeled as representative, in FIG. 3). Also, if desired, the interior of the oven can be temperature controlled by appropriately spaced circulating air convection heating sources so that the interior of the oven outside the microwave cavities is maintained at a preferred constant temperature, e.g., 160–180° F., during conveyorized transport of the leaves. In a mobile system such as depicted in FIG. 3 for field usage, the electrical requirements can be supplied by a pair of conventional diesel-powered generators 9, 10. Of course, the microwave drying system can also be operated in a fixed location, if desired, powered by conventional electrical sources.

Each of the four cavities within oven 3 in FIG. 3 receives microwave energy from a corresponding Microdry Model IV-75 microwave power source. The microwave energy enters each respective cavity via a splitter through two ports located in the top of each cavity. A mode stirrer is located below the ports in each cavity to assist in the distribution of the microwave energy. Each microwave power unit is a completely self-contained cabinet that houses the required components to operate a 75 kW magnetron. Controls for the microwave power are located on the cabinet. The units are designed for unattended continuous operation in an industrial environment. Each microwave power generator may be located at each cavity, or at a distance from the cavity. However, at a distance of 50', the transmission line losses will be about 2%. Each power generator provides adjustable microwave energy for industrial operation. The output power is adjustable from 0 to about 75 kW at the FCC assigned frequency of 915 MHz, and is controlled by a solid state control circuit manually adjusted by a control knob on the panel or by remote control with a 4–20 milliamp control signal from a process controller. While the circuitry will control the power output from zero, the frequency spectrum becomes broad at levels below about 5 kW. The power generator for each cavity is basically a direct current power supply operating an industrial magnetron which is operated and protected by circuit functions designed for automatic and manual operation. The electrical functions of the generator are monitored by meters on the control panel, located on cabinet door. The metering includes anode current, anode voltage, output power, filament current, electromagnet current and reflected power. Operation of the electromechanical interlock functions are monitored by designated lamps located on the control panel. Each microwave power generator cabinet has full width doors for maximum accessibility to the components. A built-in electromagnetic interference shielding enclosure houses the magnetron and associated microwave components. A door allows for installation of the magnetron and electromagnet. The system includes a circulator and water load, mounted inside the cabinet, which functions as an isolator to protect the magnetron in the event of a high reflected power condition. The microwave power generator uses both forced air and water for cooling the heat producing components. The magnetron and electromagnet are water cooled by a closed loop demineralized water system. A separate water source and a heat exchanger can be used to cool the water in this loop. The separate water source also flows through a water to air heat exchanger inside the cabinet to cool the cabinet air. A high pressure centrifugal blower provides cooling to the magnetron output window and the cathode structure. Water and cabinet temperatures are interlocked in the control power chain. Typical reference data for each microwave generator in a system of this are as follows:

| Power input | 95 KVA, 440–480 VAC, 3 phase, 60 Hz |
| Power output | 7S kw at 915 +/– 10 MHz |
| Magnetron tube | CTL, CWM 75 I |

Typical magnetron operation reference data are as follows:

| AC filament voltage | 11.4 V |
| Filament current | 85 A |
| DC anode voltage | 17 KV |
| Anode current | 5.0 A |
| DC electromagnet current | 4.3 A |
| Efficiency | 80% |

Further, a typical microwave generator can employ a carbon steel enclosure and have an output connection (WR 975 waveguide) in the top of the cabinet at an appropriate location.

In a throughput test, a microwave tobacco drying system generally designed as described above was effective to eliminate over 80% of the moisture content of the leaves. In particular, in one measured sample, 15 pounds of leaves with an assumed initial water content of 85 wt % and solids content of 15 wt % was conveyed through a microwave cavity in single leaf thickness at a rate of about 180 lbs per hour. The leaves were weighed after exiting the cavity. The ending weight was 4.6 lbs., or 31% of the initial weight. Thus, based on the initial assumed water content, therer remained 2.35 pounds of water in the leaves, corresponding to 18.5% of the initial water content.

Figure 2:
FIG. 2 is a photograph illustrating low-nitrosamine microwaved "yellow" Virginia flue tobacco in accordance with the present invention.

As disclosed in FIG. 2, the microwave treatment of yellow tobacco in accordance with the present invention preferably results in a dried, golden-colored tobacco product. The data presented herein establish that such dried tobacco, in its unsmoked form, has dramatically reduced carcinogenic nitrosamines, particularly NNN and NNK, as opposed to normally cured tobacco.

It has also been discovered that concentrated forms of electromagnetic radiation (i.e., concentrated as distinguished from general exposure to sunlight or electric light within the visible spectrum) having higher frequencies and shorter wavelengths than the microwave domain discussed above, can be used to achieve the basic objects of the present invention—reduction or substantial elimination of TSNAs in tobacco products, by treating the tobacco with such energy forms in approximately the same time frame post-harvest as discussed above with regard to the microwave embodiment. In other words, the same general and preferred techniques and principles discussed above regarding microwaving can be applied when such an alternate energy source is used; for example, the tobacco is treated with such radiation at approximately the same time frames post-harvest, the leaves can be de-stemmed, pressed between rollers or steamed prior to irradiation, etc.

However, while such alternate energy sources have been determined to significantly and desirably reduce or substantially eliminate or prevent formation of TSNAs, none of the other embodiments tested to date have been as effective in drying the leaves as the microwave technique described in detail. Thus, when using such an alternate energy source, it may be preferable to subject the irradiated tobacco leaves to further processing to complete the curing cycle, such as combining the irradiation step with a subsequent oven-drying or tumble-drying step.

In particular, it is believed that any electromagnetic radiation source, and accelerated particle beams such as electron beams, having frequencies higher than the microwave domain within the conventional electromagnetic spectrum are operative to significantly reduce, substantially eliminate and/or prevent formation of TSNAs when tobacco is uncured and in a state susceptible to having the amount of TSNAs reduced or formation thereof arrested. On a scale within the electromagnetic spectrum where microwaves are generally defined as inclusive of those forms of electromagnetic radiation having a frequency of $10^{11}$ Hz and a wavelength of $3\times10^{-3}$ meters, such energy sources include, without limitation, far-infrared and infrared radiation having frequencies of about $10^{12}$ to $10^{14}$ Hz and wavelengths of $3\times10^{-4}$ to $3\times10^{-6}$ meters, ultraviolet radiation having frequencies of about $10^{16}$ to $10^{18}$ Hz and wavelengths of $3\times10^{-31}$ to $\times10^{-10}$ meters, soft x-rays or lasers, cathode rays (a stream of negatively charged electrons issuing from the cathode of a vacuum tube perpendicular to the sur face), x-rays and gamma radiation typically characterized as having frequencies of $10^{21}$ Hz and higher at corresponding wavelengths.

As would be apparent to one of ordinary skill in the art, the greater the dose of radiation delivered by the energy source, the less time the leaves need to be subjected thereto to achieve the desired results. Typically, radiation application times of less than one minute, preferably less than 30 seconds and even more preferably less than about ten seconds are needed when using such higher frequency radiation sources. Defined another way, radiation application times of at least about one second are preferred. However, as shown in the Examples below, the exposure rate can be controlled to deliver the radiation dosage over time, if desired. For example, 1 megarad of radiation can be delivered instantaneously (as with the electron beam accelerator discussed below in Example 17), or at a predetermined exposure rate (as exemplified by the closed chamber gamma irradiation testing discussed below in Example 19, wherein 1 megarad (10 kGrey) of irradiation was delivered at an exposure rate of about 0.8 megarad per hour). When using high frequency radiation sources, it is preferred to use an amount of radiation which achieves at least a 50% reduction in TSNAs, in comparison to untreated samples. While the particular radiation dosages and exposure rate will depend on the particular equipment and type of radiation source being applied, as would be apparent to one of ordinary skill in the art, it is generally preferred to subject the tobacco samples to radiation of from about 0.1 to about 10 megarads, more preferably from about 0.5 to about 5 megarads, and more preferably from about 0.75 to about 1.5 megarads.

As illustrated in the following Examples, testing has been carried out on various tobacco samples using an accelerated electron beam, a $CO_2$ laser and gamma radiation as exemplary of these additional radiation sources. In each instance, the uncured, irradiated tobacco samples were demonstrated to contain significantly reduced and/or substantially eliminated TSNA contents.

In yet another embodiment of the invention, treating the tobacco while in its susceptible state in a recirculating air convection oven has also been demonstrated to reduce the TSNA content, albeit with reduced leaf quality. Unlike a conventional baking oven which is not as effective in lowering TSNA content and also lowers the tobacco quality, heating in a recirculating air convection oven at temperatures of from about 100° to about 500° F., for periods ranging from one hour at the low end down to about 5 minutes at the high end of the temperature scale, can also effectively reduce the content of or arrest formation of TSNAs in tobacco while in its susceptible state as defined herein. Even more preferably, an oven combining recirculating air convection heat and microwave radiation can shorten the heating time while providing improved quality to the leaves. For example, when a convection oven alone is used, the veins and stems are not completely dried at the time the lamina are dried, thus leading to overdried and crumbly lamina sections. Combining the microwave treatment with recirculating convection oven heat can improve the leaf quality by giving a more uniformly dried product.

In another aspect, the present invention relates to a method for reducing or substantially eliminating the content of tobacco-specific nitrosamines in a human or animal subject who smokes, chews or otherwise ingests tobacco, by providing for consumption a tobacco product having significantly reduced or substantially eliminated TSNAs.

Subjecting the uncured tobacco to microwave or other radiation energy is demonstrated herein to be effective to provide tobacco have surprisingly low nitrosamine contents. These techniques can be facilitated by peeling and disposing of the stem down one-third to one-half length of the tobacco leaf, especially in cases where the stem is to be discarded and the moisture-wringing or steaming steps described above are not employed. Where the stem is removed in this manner, the resultant microwaved tobacco leaf does not require the use of a thrasher machine since the undesirable part of the stem is already removed. As a result, the typical loss of tobacco product associated with thrashing is eliminated, reducing tobacco waste by approximately 10% to 30%.

The improved tobacco of the present invention can be substituted in whole or part for normally-cured tobacco in any tobacco product, including cigarettes, cigars, chewing tobacco, tobacco chewing gum, tobacco lozenges, tobacco pouches, snuff, or tobacco flavoring and food additives. For the purposes of smoking, the present invention provides a less noxious odor while maintaining good smoking characteristics and providing full flavor with normal nicotine content. For the purposes of chewing, snuff, pouch and food additives, the tobacco of the present invention has a rich, pleasant flavor.

The present invention is now illustrated by reference to the following examples, which are not intended to limit the scope of the invention in any manner.

EXAMPLE 1

Virginia flue tobacco was harvested, and the leaves were placed in a curing barn at about 100–110° F. to begin the flue-curing process. Samples 1–3 were taken from the barn after the leaves had turned yellow, about 24–36 hours post-harvest. Sample 1 was a lamina sample, stripped of the midrib, and baked in a convection air oven at about 400–500° C. for about 1 hour, which browned the lamina. Sample 2 was a yellow leaf, placed in a Goldstar Model MA-1572M microwave oven (2450 MHz), and heated on the high power setting (1,000 watts) while rotating for about 2½ minutes. Sample 3 was a yellow leaf, untreated, used as a control. Samples 4 and 5 remained in the curing barn under elevated temperature of about 180° F., Sample 4 being dried outside the racks and Sample 5 inside the racks. Sample 6 was a cured, brown leaf, having underwent the normal flue-cure process.

Analyses were performed on each sample to determine NNN, NAT, NAB and NNK contents. In this and the following examples, "TSNA" represents the sum of these four tobacco-specific nitrosamines. Sample work-up and extraction followed a typical procedure for analysis of TSNAs (see, for example, Burton et al., "Distribution of Tobacco Constituents in Tobacco Leaf Tissue. 1. Tobacco-specific Nitrosamines, Nitrate, Nitrite and Alkaloids", J. Agric. Food Chem., Volume 40, No. 6, 1992), and individual TSNAs were quantified on a Thermedics Inc. TEA Model 543 thermal energy analyzer coupled to a Hewlett-Packard Model 5890A gas chromatograph. The results are shown in Table 1 below. All data in each table below are presented in micrograms of the nitrosamine per gram of sample (i.e., parts per million or $\mu g/g$):

TABLE 1

| Sample # | NNN | NAT + NAB | NNK | TSNA |
|---|---|---|---|---|
| 1 - yellow baked lamina | 0.0310 | 0.843 | <0.0004 | 0.1157 |
| 2 - yellow microwaved | <0.0004 | <0.0006 | <0.0005 | <0.0014 |
| 3 - yellow control | 0.0451 | 0.1253 | 0.0356 | 0.2061 |
| 4 - rapid drying outside racks | 0.6241 | 1.4862 | 1.2248 | 3.3351 |
| 5 - rapid drying inside racks | 0.7465 | 1.5993 | 1.3568 | 3.7044 |
| 6 - regular flue-cured | 1.0263 | 1.7107 | 2.2534 | 4.9904 |

EXAMPLE 2

Virginia flue tobacco was harvested. Sample 7 was a fresh-cut, green leaf used as a control, while Sample 8 was a fresh-cut green leaf which was subjected to microwave radiation in a multimode microwave applicator manufactured by MicroDry of Louisville, Ky., operating at 2450 MHz at 2.5 kilowatts, for about 20 seconds. Samples 9–12 were made from normally flue-cured brown tobacco. Sample 9 was tobacco from a formed cigarette; Sample 10 was loose, shredded tobacco for making cigarettes; Samples 11 and 12 were the same as Samples 9 (cigarette) and 10 (loose), respectively, except that each was subjected to the same microwave conditions as Sample 8. TSNA contents were analyzed in the same manner as in Example 1. The results are shown in Table 2 below:

TABLE 2

| Sample # | NNN | NAT + NAB | NNK | TSNA |
|---|---|---|---|---|
| 7 - fresh leaf control | <0.0104 | 0.126 | 0.0005 | 0.126 |
| 8 - fresh leaf - microwaved | 0.029 | 0.135 | 0.0004 | 0.164 |
| 9 - control cigarette | 1.997 | 3.495 | 2.735 | 8.226 |
| 10 - control loose | 2.067 | 3.742 | 2.982 | 8.791 |
| 11 - cigarette microwaved | 2.056 | 3.499 | 2.804 | 8.359 |
| 12 - loose microwaved | 2.139 | 3.612 | 2.957 | 8.707 |

EXAMPLE 3

The following cigarette brands shown in Table 3 were purchased at random at various retailers in Lexington, Ky., and analyzed for TSNA content using the procedure described in Example 1:

TABLE 3

| Sample # | Code No. | NNN | NAT + NAB | NNK | TSNA |
|---|---|---|---|---|---|
| 13- Marlboro-king-pc | 288292 | 3.565 | 4.538 | 1.099 | 9.202 |
| 14- Marlboro-king-pc | 288292 | 4.146 | 4.992 | 1.142 | 10.279 |
| 15- Marlboro-king-pc | 288292 | 3.580 | 4.290 | 1.106 | 8.977 |
| 16- Marlboro-king-pc | 288292 | 3.849 | 4.748 | 1.130 | 9.728 |
| 17- Marlboro-lights-100's-bx | 288192 | 4.604 | 5.662 | 1.223 | 11.489 |
| 18- Marlboro-lights-100's-pc | 288182 | 3.471 | 3.859 | 1.211 | 8.541 |
| 19- Marlboro-lights-100's-pc | 288182 | 3.488 | 4.136 | 1.074 | 8.698 |
| 20- Marlboro-lights-100's-pc | 288182 | 3.566 | 4.240 | 1.164 | 8.970 |
| 21- Winston-100's-pc | 123143 | 2.311 | 2.968 | 1.329 | 6.608 |
| 22- Winston-king | 123103 | 2.241 | 2.850 | 1.256 | 6.348 |
| 23- Winston-king-bx | 125123 | 2.162 | 2.831 | 1.326 | 6.319 |
| 24- Winston-king-bx | 123123 | 2.577 | 3.130 | 1.297 | 6.914 |
| 25- Winston-king-pc | 123103 | 1.988 | 2.563 | 1.234 | 5.786 |

TABLE 3-continued

| Sample # | Code No. | NNN | NAT + NAB | NNK | TSNA |
|---|---|---|---|---|---|
| 26-Winston-lights-100's-pc | 123133 | 2.161 | 2.706 | 1.258 | 6.124 |
| 27-Winston-lights-100's-pc | 123133 | 2.189 | 2.699 | 1.262 | 6.150 |
| 28-Winston-lights-100's-pc | 123133 | 2.394 | 3.385 | 2.330 | 8.109 |

EXAMPLE 4

Virginia flue tobacco was harvested, and the leaves were placed in a curing barn at about 100–110° F. to begin the flue-curing process. After the leaves turned yellow, about 24–36 hours post-harvest, they were taken out of the barn and microwaved in Goldstar Model MA-1572M microwave oven (2450 MHz), high power setting (1000 watts), for about 2½ minutes while rotating. The leaves were effectively dried by this procedure, although they did not turn brown, but instead retained their golden-yellow color. The leaves were shredded and made into cigarettes. Samples 29–33 were taken from a batch labeled Red Full Flavor, while Samples 34–38 were taken from a batch labeled blue Light. Samples 39–42 were cigarettes purchased at a health food store, under the brand Natural American Spirit. Samples 29–42 were analyzed for TSNA content using the procedure described in Example 1, and the results are shown in Table 4 below:

TABLE 4

| Sample # | | NNN | NAT + NAB | NNK | TSNA |
|---|---|---|---|---|---|
| 29-RED FULL FLAVOR REP 1 | | 0.138 | 0.393 | <0.0005 | 0.532 |
| 30-RED FULL FLAVOR REP 2 | | 0.192 | 0.231 | <0.0005 | 0.423 |
| 31-RED FULL FLAVOR REP 3 | | 0.129 | 0.220 | <0.0007 | 0.349 |
| 32-RED FULL FLAVOR REP 4 | | 0.145 | 0.260 | <0.0007 | 0.406 |
| 33-RED FULL FLAVOR REP 5 | | 0.140 | 0.293 | <0.0006 | 0.434 |
| | AVG | 0.149 | 0.279 | <0.0006 | 0.429 |
| | STD | 0.022 | 0.062 | 0.0001 | 0.059 |
| 34-BLUE LIGHT REP 1 | | 0.173 | 0.162 | <0.0005 | 0.335 |
| 35-BLUE LIGHT REP 2 | | 0.046 | 0.229 | <0.0005 | 0.275 |
| 36-BLUE LIGHT REP 3 | | 0.096 | 0.188 | <0.0005 | 0.285 |
| 37-BLUE LIGHT REP 4 | | 0.067 | 0.215 | <0.0005 | 0.282 |
| 38-BLUE LIGHT REP 5 | | 0.122 | 0.218 | <0.0005 | 0.341 |
| | AVG | 0.101 | 0.202 | <0.0005 | 0.304 |
| | STD | 0.044 | 0.024 | 0.0000 | 0.028 |
| 39-NATURAL AMERICAN SPIRIT | | 0.747 | 1.815 | 1.455 | 4.017 |
| 40-NATURAL AMERICAN SPIRIT | | 0.762 | 1.805 | 1.458 | 4.025 |
| 41-NATURAL AMERICAN SPIRIT | | 0.749 | 1.826 | 1.464 | 4.039 |
| 42-NATURAL AMERICAN SPIRIT | | 0.749 | 1.760 | 1.462 | 3.971 |
| | AVG | 0.752 | 1.802 | 1.460 | 4.013 |
| | STD | 0.006 | 0.025 | 0.004 | 0.025 |

STD in the Tables herein is the standard deviation for the average of the samples shown.

EXAMPLE 5

Virginia flue tobacco was harvested, and the leaves were placed in a curing barn at about 100–110° F. to begin the flue-curing process. Samples 43–44 were taken from the barn after the leaves had turned yellow, about 24–36 hours post-harvest, and subjected to microwave radiation in the MicroDry multimode applicator described above for about 20 and 30 seconds, respectively, at a power level of about 6 kilowatts. Samples 43 and 44 were dried, golden-yellow leaves after the microwaving. Samples 45–51 were made from brown, cured leaves having underwent the normal flue-cure process. Sample 45 was a control; Samples 46 and 47 were baked in a convection oven preheated to about 400–500° F. for about 1 and about 3 minutes, respectively; and Samples 48 and 49 were subjected to microwave radiation (915 MHz) in a Waveguide applicator Model WR-975, a large multimode oven manufactured by Micro-Dry (power settings from 0–75 KW) at 50 kilowatts for about 10 and 40 seconds, respectively. Samples 50 and 51 were cut (reconstituted sheet) tobacco made from the flue-cured leaves. Sample 50 was subjected to microwave radiation in the Waveguide microwave oven at 50 kilowatts for about 1.5 minutes, while Sample 51 was baked in a convection oven preheated to about 400–500° F. for about 3 minutes. These samples were analyzed for TSNA content using the procedure described in Example 1, and the results are shown in Table 5 below:

TABLE 5

| Sample # | NNN | NAT + NAB | NNK | TSNA |
|---|---|---|---|---|
| 43-20 SEC MICROWAVE | <0.0106 | <0.1068 | <0.0007 | <0.1181 |
| 44-30 SEC MICROWAVE | <0.0103 | <0.1065 | <0.0004 | <0.1172 |

TABLE 5-continued

| Sample # | NNN | NAT + NAB | NNK | TSNA |
|---|---|---|---|---|
| 45-CONTROL NO MICRO | 0.92 | 2.05 | 3.71 | 6.68 |
| 46-OVEN 1 MIN | 1.14 | 2.41 | 5.10 | 8.66 |
| 47-OVEN 3 MIN | 0.89 | 2.06 | 2.68 | 5.64 |
| 48-WAVEGUIDE 10 SEC 50 KW | 1.00 | 2.31 | 3.29 | 6.59 |
| 49-WAVEGUIDE 40 SEC 50 KW | 0.62 | 1.55 | 1.69 | 3.86 |
| 50-CUT TOBACCO WAVEGUIDE 1.5 MIN 50 KW | 4.22 | 4.91 | 0.99 | 10.12 |
| 51-CUT TOBACCO OVEN 3 MIN | 4.76 | 5.60 | 1.08 | 11.44 |

EXAMPLE 6

Virginia flue tobacco was harvested, and the leaves were placed in a curing bar at about 100–110° F. to begin the flue-curing process. Samples 52–55 were cigarettes made from yellow tobacco which had been pulled from the barn after about 24–36 hours, and subjected to Microwave radiation in a Goldstar microwave oven, Model MA-1572M (2450 MHz), for about 2 minutes on the high power setting (1000 watts). For comparison, Samples 61 and 62 were cigarettes made from leaves which had undergone the normal flue-cure process, without microwave treatment. Sample 56 was a cured leaf; Sample 57 was post-yellow, not fully cured; Sample 58 was a cured lamina, while Samples 59 and 60 were cured midribs. TSNA contents were measured as in Example 1, and the results are set forth in Table 6 below:

TABLE 6

| Sample # | NNN | NAT + NAB | NNK | TSNA |
|---|---|---|---|---|
| 52-Goldsmoke cigarettes | 0.12 | 0.23 | 0.03 | 0.38 |
| 53-Goldsmoke II, 85 mm | 0.062 | 0.326 | 0.016 | 0.404 |
| 54-Goldsmoke 85 mm | 0.128 | 0.348 | 0.029 | 0.504 |
| 55-Goldsmoke 100's Sample B | 0.166 | 0.317 | 0.047 | 0.531 |
| 56-Sample M-M | 3.269 | 4.751 | 0.833 | 8.853 |
| 57-sample B-C | 0.267 | 0.720 | 0.954 | 1.941 |
| 58-Lamina M-C | 0.933 | 1.456 | 1.968 | 4.356 |
| 59-WM | 0.996 | 1.028 | 0.408 | 2.432 |
| 60-SM | 1.745 | 1.753 | 0.306 | 3.804 |
| 61-Goldsmoke control | 1.954 | 1.544 | 0.492 | 3.990 |

TABLE 6-continued

| Sample # | NNN | NAT + NAB | NNK | TSNA |
|---|---|---|---|---|
| 62-Goldsmoke control | 1.952 | 1.889 | 0.424 | 4.265 |

EXAMPLE 7

Virginia flue tobacco was harvested. Samples 63 and 66 were uncured, fresh-cut green tobacco, although over a week lapsed before TSNA measurements were taken, so some air-curing had taken place. The remaining leaves were placed in a curing barn at about 100–110° F. to begin the flue-curing process. Sample 68 was a leaf taken from the barn after it had turned yellow, about 24–36 hours post-harvest, and was subjected to microwave radiation in the Waveguide multimode applicator described above, for about 40 seconds at 25 kilowatts.

Samples 64/65 (leaves) and 67/70 (reconstituted sheet tobacco, or "cut" tobacco) demonstrate the effects of the present invention when cured tobacco is rehydrated, then subjected to microwave radiation. Samples 64 and 65 were leaf samples having undergone the normal flue-curing process; however, Sample 64 was rehydrated by running under an open faucet for about 5–10 seconds. The leaf absorbed significant moisture. Each of Samples 64 and 65 was then microwaved in the Waveguide multimode applicator for about 40 seconds at 25 kilowatts. Samples 67 and 70 were reconstituted sheet tobacco samples, made from cured leaves. Sample 67 was rehydrated by adding water so that a significant quantity was absorbed, then microwaved under the conditions described for Sample 64. Sample 70 was not microwaved. Samples 69, 71 and 72 are additional cured leaf samples, used as controls. The TSNA contents were measured as in Example 1, and the results are shown in Table 7:

TABLE 7

| Sample # | NNN | NAT + NAB | NNK | TSNA |
|---|---|---|---|---|
| 63-CONTROL UNCURED | 0.010 | 0.263 | 0.000 | 0.274 |
| 64-CURED 40 SEC (WET) | 0.737 | 1.252 | 1.893 | 3.882 |
| 65-CURED 40 SEC | 0.767 | 1.520 | 2.229 | 4.516 |
| 66-UNCURED 40 SEC | 0.010 | 0.261 | 0.000 | 0.272 |
| 67-CUT TOBACCO CURED 40 SEC (WET) | 0.769 | 1.328 | 0.308 | 2.405 |
| 68-UNCURED 40 SEC 25 KW WAVEGUIDE | 0.051 | 0.244 | 0.014 | 0.308 |
| 69-CURED CONTROL | 0.866 | 1.548 | 2.545 | 4.960 |
| 70-CONTROL CUT TOBACCO | 1.872 | 2.536 | 0.789 | 5.197 |
| 71-CONTROL 'AL' WHOLE LEAF | 0.230 | 0.606 | 0.746 | 1.582 |
| 72-SML WHOLE LEAF | 0.413 | 0.884 | 1.514 | 2.810 |

EXAMPLE 8

Virginia flue tobacco was harvested, and the leaves were placed in a curing barn at about 100–110° F. to begin the flue-curing process. Sample 73 was a leaf taken from the barn after it turned yellow, about 24–36 hours post-harvest, and microwaved in a Goldstar Model MA-1572M for about 2 minutes on the high setting. Samples 74–76 were flue-cured in the normal way. Sample 74 was a cured control. Samples 75 and 76 were rehydrated as in Example 7 (Sample 64), then each sample was subjected to microwave radiation in the MicroDry applicator (2450 MHz) for about 20 seconds (Sample 75) and about 40 seconds (Sample 76), respectively, at power levels of about 6 kilowatts. Samples 77–79 were reconstituted sheet tobacco, made from the flue-cured leaves. Sample 77 was a control, while Samples 78 and 79 were rehydrated as in Example 7 (Sample 67). Samples 78 and 79 were microwaved in the MicroDry applicator for about 30 seconds each; Sample 78 rested on the oven bottom, while Sample 79 was raised up several inches by resting the sheet sample on a styrofoam cup, which permitted more uniform heating. TSNA contents were measured as in Example 1, and the results are set forth in Table 8 below:

TABLE 8

| Sample # | NNN | NAT + NAB | NNK | TSNA |
| --- | --- | --- | --- | --- |
| 73-yellow/ microwaved | 0.052 | 0.260 | <0.0004 | 0.313 |
| 74-A- control leaf, cured | 1.168 | 1.904 | 1.662 | 4.734 |
| 75-B- 20 SECONDS | 0.791 | 1.705 | 1.115 | 3.611 |
| 76-C 40 SECONDS | 0.808 | 1.624 | 1.160 | 3.592 |
| 77- CONTROL- sheet | 4.417 | 3.697 | 0.960 | 9.073 |
| 78-30 SECONDS | 2.755 | 2.553 | 0.644 | 5.952 |
| 79-30 SECONDS ELEVATED | 1.606 | 1.732 | 0.350 | 3.687 |

EXAMPLE 9

Samples 80–81 were Redman chewing tobacco purchased at retail. Sample 80 was a control, while Sample 81 was microwaved in a Goldstar Model MA-1572M for about 1–2 minutes on the high power setting. Samples 82-83 were Skoal snuff purchased at retail. Sample 82 was a control, while Sample 83 was microwaved in the same manner as for Sample 81. TSNA contents were measured, and the results are shown in Table 9 below:

TABLE 9

| Sample # | NNN | NAT + NAB | NNK | TSNA |
| --- | --- | --- | --- | --- |
| 80-CHEWING TOBACCO BEFORE | 0.712 | 0.927 | 0.975 | 1.713 |
| 81-CHEWING TOBACCO AFTER | 0.856 | 0.906 | 0.122 | 1.884 |
| 82-SNUFF BEFORE | 4.896 | 10.545 | 1.973 | 17.414 |
| 83-SNUFF AFTER | 6.860 | 14.610 | 1.901 | 23.370 |

EXAMPLE 10

To test whether TSNAs accumulate over time even after yellow tobacco is microwaved in accordance with the present invention, additional samples (designated -A) of the cigarettes tested in Example 4, Samples 29, 35 and 39 (control) were retested for TSNA content more than seven months after the TSNA contents were first measured, as reported in Example 4. The results are shown below in Table 10:

TABLE 10

| Sample # | NNN | NAT | NAB | NNK | TSNA |
| --- | --- | --- | --- | --- | --- |
| 29A-RED FF REP #1 | 0.1109 | 0.1877 | 0.1078 | 0.0015 | 0.4079 |
| 35A-BLUE LIGHT REP #2 | 0.0508 | 0.1930 | 0.1075 | 0.0012 | 0.3525 |
| 39A- NATURAL AMERICAN SPIRIT REP #1 | 0.6151 | 1.2357 | 0.1072 | 0.9302 | 2.8882 |

EXAMPLE 11

Virginia flue tobacco was harvested, and the leaves were placed in a curing barn at about 100–110° F. to begin the flue-curing process. After the leaves turned yellow, about 24–36 hours post-harvest, they were taken from the barn and subjected to microwave radiation in a Goldstar Model MA-1572M microwave oven for about 2 to 2½ minutes, on the high power setting. Each of the leaves was a golden-yellow color, and effectively dried. Certain samples, designated by "ground", were later ground up into a flour-like substance, which would be useful as, for example, a gum, lozenge or food additive. After more than six months from the time the leaves were microwaved, the TSNA content of the following samples were measured using the procedure described in Example 1. The results are shown in Table 11 below:

TABLE 11

| Sample # | NNN | NAT | NAB | NNK | TSNA |
| --- | --- | --- | --- | --- | --- |
| 84- ground | 0.0013 | 0.0018 | 0.0018 | 0.0015 | 0.0064 |
| 85- ground | 0.0469 | 0.0341 | 0.0011 | 0.0009 | 0.0831 |
| 86- ground | 0.0009 | 0.0582 | 0.0013 | 0.0011 | 0.0615 |
| 87- ground | 0.0113 | 0.1078 | 0.1078 | 0.0015 | 0.2284 |
| 88- ground | 0.0569 | 0.1401 | 0.1071 | 0.0009 | 0.3051 |
| 89- ground | 0.0109 | 0.1642 | 0.1073 | 0.0011 | 0.2835 |
| 90- ground | 0.0008 | 0.0011 | 0.0011 | 0.0009 | 0.0038 |
| 91- ground | 0.0009 | 0.0012 | 0.0012 | 0.0010 | 0.0044 |
| 92- ground | 0.0012 | 0.1059 | 0.0017 | 0.0014 | 0.1101 |
| 93- ground | 0.0013 | 0.0529 | 0.0019 | 0.0015 | 0.0576 |
| 94- ground | 0.0012 | 0.0613 | 0.0017 | 0.0014 | 0.0657 |
| 95- ground | 0.0506 | 0.0989 | 0.0013 | 0.0010 | 0.1518 |
| 96- ground | 0.0017 | 0.0894 | 0.0024 | 0.0019 | 0.0954 |
| 97- ground | 0.0012 | 0.0017 | 0.0017 | 0.0014 | 0.0061 |

TABLE 11-continued

| Sample # | NNN | NAT | NAB | NNK | TSNA |
|---|---|---|---|---|---|
| 98-ground | 0.0016 | 0.0023 | 0.0023 | 0.0619 | 0.0082 |
| 99-ground | 0.0342 | 0.0016 | 0.0016 | 0.0013 | 0.0386 |
| 100-ground- | 0.0014 | 0.0020 | 0.0020 | 0.0016 | 0.0070 |
| 101-leaf | 0.0013 | 0.0539 | <0.0019 | <0.0016 | 0.0587 |
| 102-leaf | 0.0009 | 0.0012 | <0.0012 | <0.0010 | 0.0043 |
| 103-shredded leaves | 0.0202 | 0.0327 | <0.0007 | <0.0006 | 0.0542 |

EXAMPLE 12

Virginia flue tobacco was harvested, and the leaves were placed in a curing barn at about 100–110° F. to begin the flue-curing process. Samples 104 and 105 were leaf samples having undergone the normal flue-curing process, without microwave treatment. Sample 104 was a cured midrib, while Sample 105 was cured a lamina. Sample 106 was yellow tobacco, taken from the barn after the leaves had turned yellow, about 24–36 hours post harvest. After being taken from the barn, the leaves were subjected to microwave radiation in a Goldstar Model MA-1572M microwave oven for about 2–2½ minutes, on the high power setting. Each of the leaves was a golden-yellow color, and effectively dried. Certain of the dried leaves were further processed in a conventional manner to form a tobacco extract, which was designated Sample 107 for purposes of analysis. The TSNA contents of Samples 104–107 were measured using the procedure described in Example 1. The results are shown in Table 12 below.

TABLE 12

| Sample # | NNN | NAT & NAB | NNK | TSNA |
|---|---|---|---|---|
| 104 - control midrib | 0.083 | 0.180 | <0.003 | 0.266 |
| 105 - control lamina | 0.928 | 1.367 | 2.613 | 4.908 |
| 106 - microwaved leaves | <0.004 | <0.006 | <0.005 | <0.015 |
| 107 - microwaved extract | <0.004 | <0.005 | <0.004 | <0.013 |

EXAMPLE 13

Virginia flue tobacco was harvested, and the leaves were placed in a curing barn at about 100–110° F. to begin the flue-curing process. Samples 108 and 109 were leaf samples having undergone the normal flue-curing process. Sample 108 was a cured lamina, while sample 109 was a cured midrib. Samples 110 and 111 were yellow tobacco, taken from the barn after the leaves had turned yellow, about 24–36 hours post-harvest. After being taken from the barn, Samples 110 and 111 were heated in a circulating air convection oven, a Sharp Carousel Convection/Microwave Model No. R-9H84B. Sample 110 was rapidly heated at about 300° F. for between 5–10 minutes. Sample 111 was more slowly heated at lower temperatures, starting at about 100° F. and being stepped up to about 150° F. after more than 10 minutes, for a total heating time of over 20 minutes. The TSNA contents of Samples 108–111 were measured using the procedure described in Example 1. The results are shown in Table 13 below.

TABLE 13

| Sample # | NNN | NAT & NAB | NNK | TSNA |
|---|---|---|---|---|
| 108 - control lamina | 1.267 | 2.509 | 1.377 | 5.153 |
| 109 - control midrib | <0.004 | 0.464 | <0.004 | 0.472 |
| 110 - convection-rapid | <0.004 | <0.005 | <0.004 | <0.013 |
| 111 - convection-slow | <0.003 | <0.004 | <0.003 | <0.010 |

Although the convection oven heating was shown to reduce TSNA levels, the quality of the tobacco was inferior to that obtained upon microwaving in accordance with preferred examples of the invention. Also, the heating time is necessarily longer than when using the microwave radiation treatment or other forms of higher frequency radiation. In particular, the convection heating was unable to lock the color in at the desired golden-yellow, and the lamina had a tendency to be over-dried and therefore brittle, while the veins and midrib were not completely dried. In contrast, in accordance with the most preferred embodiments of the invention, the microwaved leaves were effectively dried and retained a golden-yellow color after being subjected to treatment, while staying supple and pliable for further processing, especially as cigarettes. In convection-oven produced samples, the lamina when dried has a tendency to crumble into a dust and small tobacco particles.

EXAMPLE 14

Kentucky burley tobacco was harvested, and the leaves were processed as follows after they began to turn yellow, about 24–48 hours post-harvest. Samples 112–117 were leaf samples from this batch, further processed as follows. Sample 112 was microwaved under approximately the same conditions as Sample 106 in Example 12. The leaves were a golden-yellow color and effectively dried. Samples 113, and 114 and 117 were heated in the same circulating air convection oven as described in Example 13, Sample 113 being heated under approximately the same conditions as Sample 110, Sample 114 being heated under approximately the same conditions as Sample 111, and Sample 117 being heated at about 350° F. for about 20 minutes. The quality of Samples 113, 114 and 117 was akin to that of Samples 110 and 111, as described in Example 13. Samples 115 and 116 were heated in the Sharp Carousel Convection/Microwave oven described in Example 13, using the combined microwave (30%)/convection (300° C.) feature until the leaves were effectively dried to golden-yellow color. The TSNA contents of Samples 112–117 were measured using the procedure described in Example 1. The results are shown in Table 14 below:

TABLE 14

| Sample # | NNN | NAT & NAB | NNK | TSNA |
|---|---|---|---|---|
| 112 - microwaved | <0.007 | <0.010 | <0.008 | <0.025 |
| 113 - convection | <0.003 | <0.004 | <0.003 | <0.010 |
| 114 - convection | <0.012 | <0.017 | <0.014 | <0.043 |
| 115 - microwave (30%)/ convection | <0.002 | <0.003 | <0.003 | <0.008 |
| 116 - microwave (30%)/ convection | <0.002 | <0.003 | <0.002 | <0.007 |
| 117 - convection | 0.131 | 0.156 | <0.003 | 0.290 |

EXAMPLE 15

Virginia flue tobacco was harvested, and the leaves were placed in a curing barn at about 100–110° F. to begin the flue-curing process. Samples 118-120 were leaf samples, taken from the barn after the onset of yellowing, and shortly thereafter subjected to microwave radiation in a conventional kitchen-type microwave oven for about 2 to 2½ minutes until the leaves were effectively dried to a golden-yellow color, without burning or charring. Samples 121–123 were samples of Kentucky burley tobacco, harvested and processed after the onset of yellowing in each instance as follows. Sample 121 was placed in a conventional steam tumble dryer typically used in the tobacco industry, at a temperature of about 200° F., until the leaves had browned and dried somewhat. Sample 122 was microwaved in the above-referenced Goldstar microwave on high for about 2 minutes, the rehydrated with water and placed in the tumble dryer to impart a slight browning to the leaves which is believed to enhance the flavor. Sample 123 was treated like Sample 122, except that it was microwaved for 1 minute and was not rehydrated before being put in the tumble dryer. TSNA contents were likewise measured as in Example 1, and the results are shown in Table 15 below:

TABLE 15

| Sample # | NNN | NAT & NAB | NNK | TSNA |
|---|---|---|---|---|
| 118 | <0.003 | 0.150 | <0.003 | 0.156 |
| 119 | <0.003 | <0.004 | <0.003 | <0.010 |
| 120 | <0.002 | <0.003 | <0.003 | <0.008 |
| 121 | 0.486 | 1.059 | <0.003 | 1.548 |
| 122 | <0.004 | <0.005 | <0.004 | <0.013 |
| 123 | <0.003 | <0.004 | <0.004 | <0.011 |

EXAMPLE 16

North Carolina burley tobacco was harvested, and the leaves were processed as follows after they began to turn yellow, about 2–3 days post-harvest. Sample 118 was a leaf sample which had been subjected to microwave radiation in the same type of Goldstar microwave oven described above, on the high power setting for about 2 minutes. After microwaving the leaves were a golden yellow color, and effectively dried. The TSNA content was measured using the procedure described in Example 1. The results are shown in Table 16 below:

TABLE 16

| Sample # | NNN | NAT & NAB | NNK | TSNA |
|---|---|---|---|---|
| 118 | 0.024 | 0.048 | <0.001 | 0.073 |

EXAMPLE 17

This example demonstrates the effectiveness of using electron beam radiation to reduce the content of, or substantially prevent formation of TSNAs, in yellow tobacco samples. North Carolina burley tobacco was harvested. Samples 119–122 were leaf samples, air-cured by hanging outside in a normal manner, until the leaves were effectively dried and brown. Sample 119 was untreated as a control. Samples 120 and 121 were subjected to electron beam radiation on a conveyor belt using a Dynamitron Electron Beam Accelerator, manufactured by Radiation Dynamics, Inc. of Edgewood, N.Y., at an exposure rate of 1 megerad. Sample 122 was subjected to microwave radiation in the Goldstar microwave oven for about 2 minutes on the high power setting. Sample 123 was taken from the tip of a burley leaf after it had begun to turn yellow. Sample 124 was a leaf stem portion, taken from the same plant as Sample 123, and was still somewhat green-colored. Samples 125 and 126 were whole leaf burley samples, at the yellow stage. Each of Samples 123–126 was subjected to electron beam radiation using the above-describing Dynamitron, in the same manner and under the same exposure rate as Samples 120 and 121, as described above. The above samples were tested to measure TSNA content according to the procedure set forth in Example 1, and the results are shown in Table 17 below:

TABLE 17

| Sample # | NNN | NAT & NAB | NNK | TSNA |
|---|---|---|---|---|
| 119 - control, cured | 3.6351 | 1.0847 | 0.0470 | 4.7668 |
| 120 - high power, cured | 6.5718 | 3.7037 | 0.4368 | 10.7123 |
| 121 - low power, cured | 4.4771 | 1.6112 | 0.7468 | 6.8369 |
| 122 - microwave, cured | 4.8974 | 1.6393 | 1.1200 | 7.6567 |
| 123 - yellow tip | 0.1812 | 0.3667 | 0.0013 | 0.5492 |
| 124 - green stem | 0.1918 | 0.8310 | 0.0016 | 1.0243 |
| 125 whole leaf | 0.0014 | 0.1019 | 0.0016 | 0.1048 |
| 126 - whole leaf | 0.0646 | 0.2465 | 0.0019 | 0.3130 |

Although the above data show that electron beam radiation is effective to prevent formation of substantial quantities of co-specific nitrosamines in the yellow leaf samples tested, the leaves were not dried as effectively as when leaves in a similar state post-harvest were subjected to microwave radiation, as described in other examples of this application. Thus, commercial applications of the electron beam irradiation process may require an additional drying step, such as conveying the irradiated leaves through a conventional drying oven, to facilitate the curing process.

EXAMPLE 18

This example demonstrates that high energy beams produced by lasers are also effective to achieve the low TSNA goals of the present invention. A $CO_2$ laser made by Luxar Corp., Model LX-20SP, was used to irradiate yellow Virginia flue tobacco leaves, at about 2–3 days post-harvest. A NovaScan handpiece was used under the superpulse E program, which determines the speed of application in patterns per second. A setting of E10 was used, which delivers 10 patterns per second. Eight subsamples of leaves, T-1 to T-8, were irradiated according to the following protocol:

| E10 - 2 watts | E10 - 4 watts |
|---|---|
| T-1 - 1 pass each side | T-5 - 1 pass each side |
| T-2 - 2 passes each side | T-6 - 2 passes each side |
| T-3 - 3 passes each side | T-7 - 3 passes each side |
| T-4 - 4 passes each side | T-8 - 4 passes each side |

At 2 watts, approximately 120 mJ of energy is delivered in each scan or pass, while at 4 watts, approximately 240 mJ is delivered in each such scan.

Subsamples T-1 to T-4 were mixed and combined together to form leaf Sample 127, which was evaluated for TSNA content in the same manner as described in Example 1. Subsamples T-5 to T-8 were similarly mixed and combined together to form leaf Sample 128, which was likewise evaluated for TSNA content. The results are shown in Table 18 below:

TABLE 18

| Sample # | NNN | NAT & NAB | NNK | TSNA |
|---|---|---|---|---|
| 127 | 0.1031 | 0.2025 | 0.0006 | 0.3061 |
| 128 | 0.1019 | 0.1287 | 0.0010 | 0.2315 |

As with the samples described in Example 17, the $CO_2$ laser irradiated samples were not dried as effectively as the microwaved samples, although the TSNA contents were low, and therefore an additional drying step could be employed to speed the curing process. Also, after the $CO_2$ laser irradiation but prior to TSNA testing, six of the eight subsamples turned somewhat brown, with no apparent effect on TSNA content.

EXAMPLE 19

This example demonstrates that gamma radiation is also effective in preventing formation of significant amounts of TSNA in yellow tobacco. Virginia flue tobacco was taken about 2–3 days post harvest, just after the leaves had turned yellow. Each of Samples 129–132 was taken from the lamina portion of the yellow leaves, and subjected in an enclosed chamber to gamma irradiation of 10 kGrey (1 megarad) at an exposure rate of 8 kGrey (0.8 megarad) per hour, for a total exposure time of about 75 minutes. The irradiated samples were subsequently evaluated as to TSNA content in the same fashion as described above, and the results are shown below in Table 19:

TABLE 19

| Sample # | NNN | NAT & NAB | NNK | TSNA |
|---|---|---|---|---|
| 129 | 0.098 | 0.225 | 0.057 | 0.380 |
| 130 | <0.001 | <0.001 | <0.001 | <0.003 |
| 131 | <0.001 | <0.001 | <0.001 | <0.003 |
| 132 | 0.033 | 0.079 | <0.001 | 0.113 |

It will be apparent to those skilled in the art that various changes and modifications may be made in the preferred embodiments without departing from the spirit and scope of the claimed invention. Therefore, the foregoing description is intended to be illustrative only and should not be viewed in a limiting sense.

What is claimed is:

1. A process of substantially preventing formation of nitrosamines in a harvested tobacco plant, the process comprising subjecting at least a portion of the plant to a concentrated form of radiation having a frequency higher than the microwave region of the electromagnetic spectrum, while said portion is uncured, yellow, and in a state susceptible to having the formation of nitrosamines arrested, for a sufficient time to substantially prevent formation of at least one nitrosamine.

2. The process according to claim 1, wherein said subjecting to radiation is carried out on a tobacco leaf or portion thereof prior to substantial accumulation of tobacco-specific nitrosamines in the leaf or portion thereof.

3. The process according to claim 1, wherein said subjecting to radiation is carried out prior to substantial loss of the plant's cellular integrity.

4. The process according to claim 1, wherein the tobacco is flue tobacco and said subjecting to radiation is carried out within about 24 to about 72 hours post-harvest.

5. The process according to claim 1, wherein said radiation is applied to the plant for a period of at least about one second at a predetermined power level.

6. The process according to claim 1, wherein said subjecting to radiation prevents normal accumulation of at least one tobacco-specific nitrosamine in the leaf.

7. The process according to claim 6, wherein said at least one tobacco-specific nitrosamine is selected from the group consisting of N'-nitrosonornicotine, 4-(N-nitrosomethylamino)-1-(3-pyridyl)-1-butanone, N'-nitrosoanatabine and N'-nitrosoanabasine.

8. The process according to claim 2, wherein said subjecting to radiation is carried out on tobacco leaves arranged in single layer thickness, without stacking or piling of the leaves.

9. The process according to claim 8, further comprising, prior to said subjecting to radiation, a step of (a) removing stems from the tobacco leaves, (b) pressing the tobacco leaves to remove excess moisture, or (c) subjecting the tobacco leaves to a steam treatment.

10. The process according to claim 1, further comprising drying the portion after carrying out the radiation step.

11. The process according to claim 1, wherein said radiation is generated by a laser beam.

12. The process according to claim 1, wherein said radiation is an electron beam generated by an electron accelerator.

13. The process according to claim 1, wherein said radiation is gamma radiation.

14. A process of manufacturing a tobacco product, comprising subjecting harvested tobacco leaves to a concentrated form of radiation having a frequency higher than the microwave region of the electromagnetic spectrum, while said leaves are uncured, yellow, and in a state susceptible to having the formation of tobacco-specific nitrosamines arrested, for a sufficient time to substantially prevent formation of at least one tobacco-specific nitrosamine in the leaves, and forming said tobacco product comprising the irradiated leaves, the tobacco product being selected from cigarettes, cigars, chewing tobacco, snuff and tobacco-containing gum and lozenges.

15. The process according to claim 14, wherein the leaves are subjected to said radiation prior to substantial accumulation of tobacco-specific nitrosamines in the leaves.

16. The process according to claim 1, wherein said at least one nitrosamine is 4-(N-nitrosomethylamino)-1-(3-pyridyl)-1-butanone.

17. The process according to claim 14, wherein said at least one tobacco-specific nitrosamine is 4-(N-nitrosomethylamino)-1-(3-pyridyl)-1-butanone.

* * * * *